United States Patent
Yang et al.

(10) Patent No.: US 11,979,941 B2
(45) Date of Patent: May 7, 2024

(54) DATA TRANSMISSION METHOD AND TERMINAL

(71) Applicant: HUAWEI TECHNOLOGIES CO., LTD., Guangdong (CN)

(72) Inventors: Jun Yang, Shenzhen (CN); Zhongbiao Wu, Shanghai (CN); Xiaodong Tian, Shenzhen (CN); Jian Chen, Shanghai (CN); Wanjun Wei, Shanghai (CN); Shuang Zhu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 746 days.

(21) Appl. No.: 17/055,382

(22) PCT Filed: May 16, 2018

(86) PCT No.: PCT/CN2018/087153
§ 371 (c)(1),
(2) Date: Nov. 13, 2020

(87) PCT Pub. No.: WO2019/218282
PCT Pub. Date: Nov. 21, 2019

(65) Prior Publication Data
US 2021/0219127 A1   Jul. 15, 2021

(51) Int. Cl.
*H04W 8/20* (2009.01)
*G06F 13/42* (2006.01)

(52) U.S. Cl.
CPC ........ *H04W 8/205* (2013.01); *G06F 13/4282* (2013.01); *G06F 2213/0042* (2013.01)

(58) Field of Classification Search
CPC ..... H04W 8/205; H04W 92/18; H04W 88/04; G06F 13/4282; G06F 2213/0042
See application file for complete search history.

(56) References Cited

U.S. PATENT DOCUMENTS

2006/0116790 A1   6/2006 Chung et al.
2008/0207147 A1   8/2008 Rofougaran
(Continued)

FOREIGN PATENT DOCUMENTS

CN   101072397 A   11/2007
CN   101388689 A   3/2009
(Continued)

OTHER PUBLICATIONS

Brett: 11 Samsung Smart Switch Transfer With USB Connector to Galaxy S8 11 , Youtube, XP054981482, Retrieved from the Internet: URL:https://www.youtube.com/watch?v=UH8b0F vmry4, Apr. 19, 2017, total 1 pages.

*Primary Examiner* — Ping Y Hsieh
(74) *Attorney, Agent, or Firm* — WOMBLE BOND DICKINSON (US) LLP

(57) ABSTRACT

Embodiments of this application relate to the terminal field and disclose a data transmission method and a terminal, to increase a speed of data transmission between terminals and ensure stability during the data transmission. The method includes: A terminal establishes a wireless connection to another terminal; in addition, the terminal establishes a USB connection to the another terminal; then, the terminal can display a first interface, where the first interface includes at least one piece of candidate data; a user may select to-be-transmitted data from the at least one piece of candidate data after performing a first input on the first interface; and the terminal may send the to-be-transmitted data to the another terminal through the wireless connection and the USB connection after the user performs a second input on the first interface.

19 Claims, 21 Drawing Sheets

(56) References Cited

U.S. PATENT DOCUMENTS

| | | | |
|---|---|---|---|
| 2009/0070675 A1 | 3/2009 | Li | |
| 2014/0019496 A1* | 1/2014 | Chiu | H04L 69/14 707/827 |
| 2015/0056919 A1* | 2/2015 | Fyke | H04W 4/80 455/41.2 |
| 2016/0217103 A1* | 7/2016 | Kim | G06F 13/4282 |

FOREIGN PATENT DOCUMENTS

| | | |
|---|---|---|
| CN | 101827174 A | 9/2010 |
| CN | 101854202 A | 10/2010 |
| CN | 102447273 A | 5/2012 |
| CN | 203102470 U | 7/2013 |
| CN | 103580966 A | 2/2014 |
| CN | 105098273 A | 11/2015 |
| CN | 105224494 A | 1/2016 |
| CN | 105680510 A | 6/2016 |
| CN | 205384633 U | 7/2016 |
| CN | 106299515 A | 1/2017 |
| CN | 106445856 A | 2/2017 |
| CN | 106655358 A | 5/2017 |
| JP | 2008022263 A | 1/2008 |
| KR | 20050000780 A | 1/2005 |
| KR | 20050000780 A * | 1/2005 |

\* cited by examiner

DATA TRANSMISSION METHOD AND TERMINAL

CROSS-REFERENCE TO RELATED APPLICATIONS

This application is a national stage of International Application No. PCT/CN2018/087153, filed on May 16, 2018, which is hereby incorporated by reference in its entirety.

TECHNICAL FIELD

This application relates to the terminal field, and in particular, to a data transmission method and a terminal.

BACKGROUND

With rapid development of communication technologies, a storage capacity of a terminal such as a mobile phone increases. Therefore, an amount of data that a user needs to copy and transmit in a scenario such as change of a mobile phone increases accordingly.

Currently, the user may transmit data between two mobile phones by using a wireless local area network (wireless local area networks, WLAN) or the like by installing data copy software such as a Phone Clone APP (application). For example, if the user wants to copy data in an old mobile phone to a new mobile phone, the user may install the Phone Clone APP in both the old mobile phone and the new mobile phone. When the old mobile phone and the new mobile phone access a same wireless fidelity (wireless fidelity, Wi-Fi) network, the user may set the old mobile phone as a data transmit end and set the new mobile phone as a data receive end by using the Phone Clone APP, and then send, to the new mobile phone by using the Wi-Fi network, data selected by the user from the old mobile phone.

However, in the foregoing data transmission process, a data transmission speed depends on a network speed of the accessed Wi-Fi network and a stability status of the Wi-Fi network. When quality of the Wi-Fi network is poor, a speed of data transmission between terminals is affected, and even a problem such as transmission interruption is caused.

SUMMARY

Technical solutions of this application provide a data transmission method and a terminal, to increase a speed of data transmission between terminals and ensure stability during data transmission.

According to a first aspect, the technical solutions of this application provide a data transmission method, including: establishing, by a terminal, a wireless connection to another terminal; establishing, by the terminal, a universal serial bus (universal serial bus, USB) connection to the another terminal; displaying, by the terminal, a first interface, where the first interface includes at least one piece of candidate data; selecting, by a user, to-be-transmitted data from the at least one piece of candidate data after performing a first input on the first interface; and sending, by the terminal, the to-be-transmitted data to the another terminal through the wireless connection and the USB connection after the user performs a second input on the first interface.

In other words, when the user needs to transmit data between the two terminals, two transmission channels: the USB connection and the wireless connection may be established between the two terminals. The wireless connection such as a Wi-Fi connection may be first established, and then the USB connection is established; or the USB connection may be first established, and then the wireless connection is established. In this way, after the user selects the to-be-transmitted data, the terminal may simultaneously transmit the selected to-be-transmitted data to the another terminal through the two transmission channels: the USB connection and the wireless connection, thereby greatly increasing a speed of data transmission between terminals.

The wireless connection may be a Wi-Fi connection, and the terminal may establish the Wi-Fi connection to the another terminal in the following manner:

A Phone Clone APP may be installed in the terminal and the another terminal. In response to triggering of the user, the Phone Clone APP is opened on the terminal to select an old mobile phone. In response to triggering of the user, the Phone Clone APP is opened on the another terminal to select a new mobile phone. A two-dimensional code is generated on the new mobile phone, and in response to an operation of the user, the terminal scans the two-dimensional code to establish the Wi-Fi connection to the another terminal. The two-dimensional code may include information for accessing a hotspot of the another terminal, for example, a name and a password of the hotspot.

The Phone Clone APP is a data transmission application. In addition, a HuanJi APP may also be understood as a data transmission application.

In a possible technical solution, the to-be-transmitted data specifically includes first data and second data, and before the sending, by the terminal, the to-be-transmitted data to the another terminal through the wireless connection and the USB connection, the method may further include: determining, by the terminal, a size of the first data and a size of the second data based on a battery level of the terminal and a battery level of the another terminal; or determining, by the terminal, a size of the first data and a size of the second data based on network quality of the wireless connection; or determining, by the terminal, a size of the first data and a size of the second data based on a transmission speed of the USB connection. In this way, the terminal can dynamically determine which data is to be transmitted through the USB connection and which data is to be transmitted through the wireless connection, so that power consumption and a transmission speed of the terminal are optimal.

In a possible technical solution, when the wireless connection is disconnected, the terminal may further send untransmitted data to the another terminal through the USB connection.

In a possible technical solution, when the USB connection is disconnected, the terminal may further send untransmitted data to the another terminal through the wireless connection.

It may be learned that because there are the two transmission channels: the USB connection and the Wi-Fi connection between the two terminals, when either transmission channel is interrupted, a transmit end may continue to transmit data through the other transmission channel, thereby ensuring stability during data transmission.

In a possible technical solution, after the establishing, by the terminal, a USB connection to the another terminal, the method further includes: supplying, by the terminal, power to the another terminal through the USB connection.

In a possible technical solution, after the supplying, by the terminal, power to the another terminal through the USB connection, the method further includes: obtaining a remaining battery level of the terminal and a remaining battery level of the another terminal; and switching a host-slave relationship of the USB connection based on the remaining battery level of the terminal and the remaining battery level of the another terminal.

For example, the switching a host-slave relationship of the USB connection based on the remaining battery level of the terminal and the remaining battery level of the another terminal may specifically include: when a difference between the remaining battery level of the terminal and the remaining battery level of the another terminal is greater than a first threshold (for example, the first threshold is 50%), and the terminal is a party with a lower remaining battery level, switching the host-slave relationship of the USB connection.

In this way, a USB host device with a lower battery level can switch to a USB slave device that is supplied with power, and a USB slave device with a higher battery level can switch to a USB host device that supplies power. In this way, a party with a lower battery level is charged in time, to avoid a problem that transmission is interrupted because a battery level of one party is excessively low, and improve stability of a data transmission process.

In a possible technical solution, the first input and the second input may be two independent gestures; or the first input and the second input may be two phases of one gesture.

In a possible technical solution, both the terminal and the another terminal support a USB Type-C interface. The terminal establishes the USB connection to the another terminal, and the terminal may be connected to the another terminal by using a C-to-C (Type C to Type C) direct-connection data cable.

In a possible technical solution, the candidate data may specifically include at least one of Contacts, Messages, Photos, Call logs, Audio, Videos, Documents, or Applications.

In a possible technical solution, a data transmission application is installed in the terminal, and the first interface is an interface of the data transmission application.

In a possible technical solution, before the displaying, by the terminal, a first interface, the method further includes: displaying, by the terminal, a second interface of the data transmission application in response to an operation of opening the data transmission application by the user, where the second interface is used to prompt the user to set the terminal as a data transmit end or a data receive end.

In a possible technical solution, after the displaying, by the terminal, a second interface, the method further includes: in response to the operation of setting the terminal as the data transmit end or the data receive end by the user, displaying, by the terminal, prompt information to prompt the terminal to establish a connection to the another terminal.

In a possible technical solution, the wireless connection may be a Wi-Fi connection. After the terminal establishes the Wi-Fi connection to the another terminal, the terminal may further switch a current host-slave relationship of the Wi-Fi connection based on a remaining battery level of the terminal and a remaining battery level of the another terminal.

For example, the terminal is a Wi-Fi host device, the another terminal is a Wi-Fi slave device, and power consumption of the Wi-Fi host device is greater than power consumption of the Wi-Fi slave device. If it is detected that a difference between the remaining battery level of the terminal and the remaining battery level of the another terminal is greater than a second threshold (for example, the second threshold is 60%), and the terminal is a party with a lower remaining battery level, the host-slave relationship of the Wi-Fi connection may be switched.

In this way, the Wi-Fi host device with higher power consumption can switch to a Wi-Fi slave device with lower power consumption, and the Wi-Fi slave device with lower power consumption can switch to a Wi-Fi host device with higher power consumption, to alleviate a problem that transmission is interrupted because power consumption of the Wi-Fi host device is excessively high.

According to a second aspect, the technical solutions of this application provide a data transmission method. The method is applied to a scenario in which data is transmitted between a first terminal and a second terminal, and a data transmission application is installed in both the first terminal and the second terminal. The method includes: in response to triggering of a user on the first terminal, opening, by the first terminal, a data transmission application of the first terminal, and setting the first terminal as an old mobile phone; in response to triggering of the user on the second terminal, opening, by the second terminal, a data transmission application of the second terminal, and setting the second terminal as a new mobile phone; separately establishing, by the first terminal, a Wi-Fi connection and a USB connection to the second terminal; displaying, by the first terminal, a first interface of the data transmission application, where the first interface includes at least one piece of candidate data; selecting to-be-transmitted data from the at least one piece of candidate data in response to first input of the user on the first interface; and sending, by the first terminal, the selected to-be-transmitted data to the second terminal through the Wi-Fi connection and the USB connection in response to a second input of the user on the first interface. In this way, a speed of data transmission when the user changes a mobile phone by using the data transmission application increases.

In a possible technical solution, the opening, by the first terminal, a data transmission application of the first terminal, and setting the first terminal as an old mobile phone may specifically include: opening, by the first terminal, the data transmission application of the first terminal; displaying, by the first terminal, a second interface of the data transmission application, where the second interface is used to prompt the user to set the first terminal as an old mobile phone; and setting the first terminal as an old mobile phone in response to triggering of the user. Similarly, after the second terminal enables the data transmission application of the second terminal, the second terminal may also display a second interface of the data transmission application, where the second interface is used to prompt the user to set the second terminal as a new mobile phone; and the second terminal is set as a new mobile phone in response to triggering of the user.

In a possible technical solution, after the first terminal displays the second interface of the data transmission application, if the operation of setting the first terminal as an old mobile phone by the user is received, the first terminal may display prompt information to prompt the first terminal to establish a connection to the second terminal.

The prompt information may include a first prompt and a second prompt. The first prompt is used to prompt the first terminal to establish the Wi-Fi connection to the second terminal, and the second prompt is used to prompt the first terminal to establish the USB connection to the second terminal. Similarly, after the second terminal displays the second interface of the data transmission application, if the operation of setting the second terminal as a new mobile phone by the user is received, the second terminal may also display prompt information to prompt the second terminal to establish a connection to the first terminal. The prompt information may include a first prompt and a second prompt. The first prompt is used to prompt the second terminal to establish the Wi-Fi connection to the first terminal, and the second prompt is used to prompt the second terminal to establish the USB connection to the first terminal.

That the first terminal establishes the Wi-Fi connection to the second terminal may be: a two-dimensional code is generated on the second terminal (a new mobile phone), and in response to an operation of the user, the first terminal (an old mobile phone) scans the two-dimensional code to establish the Wi-Fi connection to the new mobile phone. The two-dimensional code may include information for accessing a hotspot of the second terminal, for example, a name and a password of the hotspot.

In a possible technical solution, an application framework layer of the first terminal and an application framework layer of the second terminal each include a Wi-Fi manager and a USB manager. After detecting that the Wi-Fi connection to the second terminal is established, a Wi-Fi manager of the first terminal may report a Wi-Fi connection establishment event to the data transmission application of the first terminal. After detecting that the USB connection to the second terminal is established, a USB manager of the first terminal reports a USB connection establishment event to the data transmission application of the first terminal. Similarly, after detecting that the Wi-Fi connection to the first terminal is established, a Wi-Fi manager of the second terminal may report a Wi-Fi connection establishment event to the data transmission application of the second terminal. After detecting that the USB connection to the first terminal is established, a USB manager of the second terminal reports a USB connection establishment event to the data transmission application of the second terminal. In this way, the data transmission application in the first terminal as an old mobile phone may display the first interface after determining that both the USB connection and the Wi-Fi connection are established. After determining that both the USB connection and the Wi-Fi connection are established, the data transmission application in the second terminal as a new mobile phone may wait to receive the to-be-transmitted data sent by the first terminal.

In a possible technical solution, the to-be-transmitted data includes first data and second data, and the sending, by the terminal, the to-be-transmitted data to the second terminal through the Wi-Fi connection and the USB connection specifically includes: sending, by the data transmission application of the first terminal, the first data to the second terminal on the Wi-Fi connection by invoking the Wi-Fi manager; and sending, by the data transmission application of the first terminal, the second data to the second terminal on the USB connection by invoking the USB manager.

In a possible technical solution, after the first terminal establishes the USB connection to the second terminal, the first terminal may serve as a USB host device to supply power to the second terminal. The data transmission application in the first terminal (or the second terminal) may invoke a power manager to obtain a remaining battery level of the first terminal (or the second terminal) and obtain a remaining battery level of the peer end through the USB connection or the Wi-Fi connection.

In a possible technical solution, when a difference between the remaining battery level of the first terminal and the remaining battery level of the second terminal is greater than a first threshold (for example, the first threshold is 50%), and the first terminal is a party with a lower remaining battery level, the data transmission application in the first terminal may invoke the USB manager of the first terminal to switch the USB manager from a USB host device working mode to a USB slave device working mode. Correspondingly, the data transmission application in the second terminal may also invoke the USB manager of the second terminal to switch the USB manager from a USB slave device working mode to a USB host device working mode. In this way, a process of switching a host-slave relationship between the devices at two ends of the USB connection can be completed.

In a possible technical solution, when a difference between the remaining battery level of the first terminal and the remaining battery level of the second terminal is greater than a second threshold (for example, the second threshold is 60%), and the first terminal is a party with higher power consumption in the Wi-Fi connection, the data transmission application in the first terminal may invoke the Wi-Fi manager of the first terminal to switch the Wi-Fi manager from a Wi-Fi host device working mode to a Wi-Fi slave device working mode. Correspondingly, the data transmission application in the second terminal may also invoke the Wi-Fi manager of the second terminal to switch the Wi-Fi manager from a Wi-Fi slave device working mode to a Wi-Fi host device working mode. In this way, a process of switching a host-slave relationship between the devices at two ends of the Wi-Fi connection can be completed.

In a possible technical solution, after the first terminal establishes the USB connection to the second terminal, if the USB manager in the first terminal detects that the USB connection is disconnected, the USB manager may report a USB connection disconnected event to the data transmission application corresponding to the USB manager. Further, the data transmission application may invoke the Wi-Fi manager to send untransmitted data to the second terminal on the Wi-Fi connection.

Similarly, after the first terminal establishes the Wi-Fi connection to the second terminal, if the Wi-Fi manager in the first terminal detects that the Wi-Fi connection is disconnected, the Wi-Fi manager may report a Wi-Fi connection disconnected event to the data transmission application corresponding to the Wi-Fi manager. Further, the data transmission application may invoke the Wi-Fi manager to send untransmitted data to the second terminal on the USB connection.

According to a third aspect, the technical solutions of this application provide a terminal, including: an establishment unit, configured to: establish a wireless connection to another terminal, and establish a USB connection to the another terminal; a display unit, configured to display a first interface, where the first interface includes at least one piece of candidate data; a determining unit, configured to select to-be-transmitted data from the at least one piece of candidate data in response to first input of a user on the first interface; and a transmission unit, configured to send the to-be-transmitted data to the another terminal through the wireless connection and the USB connection in response to a second input of the user on the first interface.

In a possible technical solution, the to-be-transmitted data includes first data and second data, and the determining unit is further configured to: determine a size of the first data and a size of the second data based on a battery level of the terminal and a battery level of the another terminal; determine a size of the first data and a size of the second data based on network quality of the wireless connection; or determine a size of the first data and a size of the second data based on a transmission speed of the USB connection.

In a possible technical solution, when the wireless connection is disconnected, the transmission unit is further configured to send untransmitted data to the another terminal through the USB connection.

In a possible technical solution, when the USB connection is disconnected, the transmission unit is further configured to send untransmitted data to the another terminal through the wireless connection.

In a possible technical solution, the terminal further includes a power supply unit, configured to supply power to the another terminal through the USB connection.

In a possible technical solution, the terminal further includes a switching unit, configured to: obtain a remaining battery level of the terminal and a remaining battery level of the another terminal, and switch a host-slave relationship of the USB connection based on the remaining battery level of the terminal and the remaining battery level of the another terminal.

In a possible technical solution, the switching unit is specifically configured to: when a difference between the remaining battery level of the terminal and the remaining battery level of the another terminal is greater than a first threshold, and the terminal is a party with a lower remaining battery level, switch the host-slave relationship of the USB connection.

In a possible technical solution, the first input and the second input are two independent gestures; or the first input and the second input are two phases of one gesture.

In a possible technical solution, both the terminal and the another terminal support a USB Type-C interface.

In a possible technical solution, the candidate data includes at least one of Contacts, Messages, Photos, Call logs, Audio, Videos, Documents, or Applications.

In a possible technical solution, a data transmission application is installed in the terminal, and the first interface is an interface of the data transmission application.

In a possible technical solution, the display unit is further configured to display a second interface of the data transmission application in response to an operation of opening the data transmission application by the user, where the second interface is used to prompt the user to set the terminal as a data transmit end or a data receive end.

In a possible technical solution, the display unit is further configured to: in response to the operation of setting the terminal as the data transmit end or the data receive end by the user, display prompt information to prompt the terminal to establish a connection to the another terminal.

According to a fourth aspect, the technical solutions of this application provide a terminal, including a touchscreen and one or more processors, where the processor is configured to: control the terminal to establish a wireless connection to another terminal; control the terminal to establish a USB connection to the another terminal; control the touchscreen to display a first interface, where the first interface includes at least one piece of candidate data; select to-be-transmitted data from the at least one piece of candidate data in response to first input of a user on the first interface; and control the terminal to send the to-be-transmitted data to the another terminal through the wireless connection and the USB connection in response to a second input of the user on the first interface.

In a possible technical solution, the to-be-transmitted data includes first data and second data, and the processor is further configured to: determine a size of the first data and a size of the second data based on a battery level of the terminal and a battery level of the another terminal; determine a size of the first data and a size of the second data based on network quality of the wireless connection; or determine a size of the first data and a size of the second data based on a transmission speed of the USB connection.

In a possible technical solution, the processor is further configured to: when the wireless connection is disconnected, control the terminal to send untransmitted data to the another terminal through the USB connection.

In a possible technical solution, the processor is further configured to: when the USB connection is disconnected, control the terminal to send untransmitted data to the another terminal through the wireless connection.

In a possible technical solution, the processor is further configured to control the terminal to supply power to the another terminal through the USB connection.

In a possible technical solution, the processor is further configured to: obtain a remaining battery level of the terminal and a remaining battery level of the another terminal, and switch a host-slave relationship of the USB connection based on the remaining battery level of the terminal and the remaining battery level of the another terminal.

In a possible technical solution, the processor is specifically configured to: when a difference between the remaining battery level of the terminal and the remaining battery level of the another terminal is greater than a first threshold, and the terminal is a party with a lower remaining battery level, control the terminal to switch the host-slave relationship of the USB connection.

In a possible technical solution, a data transmission application is installed in the terminal, and the first interface is an interface of the data transmission application. The processor is further configured to: in response to an operation of opening the data transmission application by the user, control the touchscreen to display a second interface of the data transmission application, where the second interface is used to prompt the user to set the terminal as a data transmit end or a data receive end.

In a possible technical solution, the processor is further configured to: in response to the operation of setting the terminal as the data transmit end or the data receive end by the user, control the touchscreen to display prompt information to prompt the terminal to establish a connection to the another terminal.

According to a fifth aspect, the technical solutions of this application provide a computer storage medium including a computer instruction, and when the computer instruction is run on a terminal, the terminal is enabled to perform the data transmission method in the first aspect.

According to a sixth aspect, the technical solutions of this application provide a computer program product, and when the computer program product is run on a computer, the computer is enabled to perform the data transmission method in the first aspect.

It may be understood that the terminal in the third aspect and the fourth aspect, the computer storage medium in the fifth aspect, and the computer program product in the sixth aspect that are provided above may be all configured to perform the corresponding methods provided above. Therefore, for beneficial effects that can be achieved by the terminal, the computer storage medium, and the computer program product, refer to the beneficial effects in the corresponding methods provided above. Details are not described herein again.

DESCRIPTION OF EMBODIMENTS

A data transmission method provided in the embodiments of this application may be applied to a terminal. For example, the terminal may be a device such as a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), a wearable electronic device, or a smartwatch, or may be a mobile phone 100 shown in FIG. 1. A specific form of the terminal is not particularly limited in the embodiments of this application.

Figure 1:
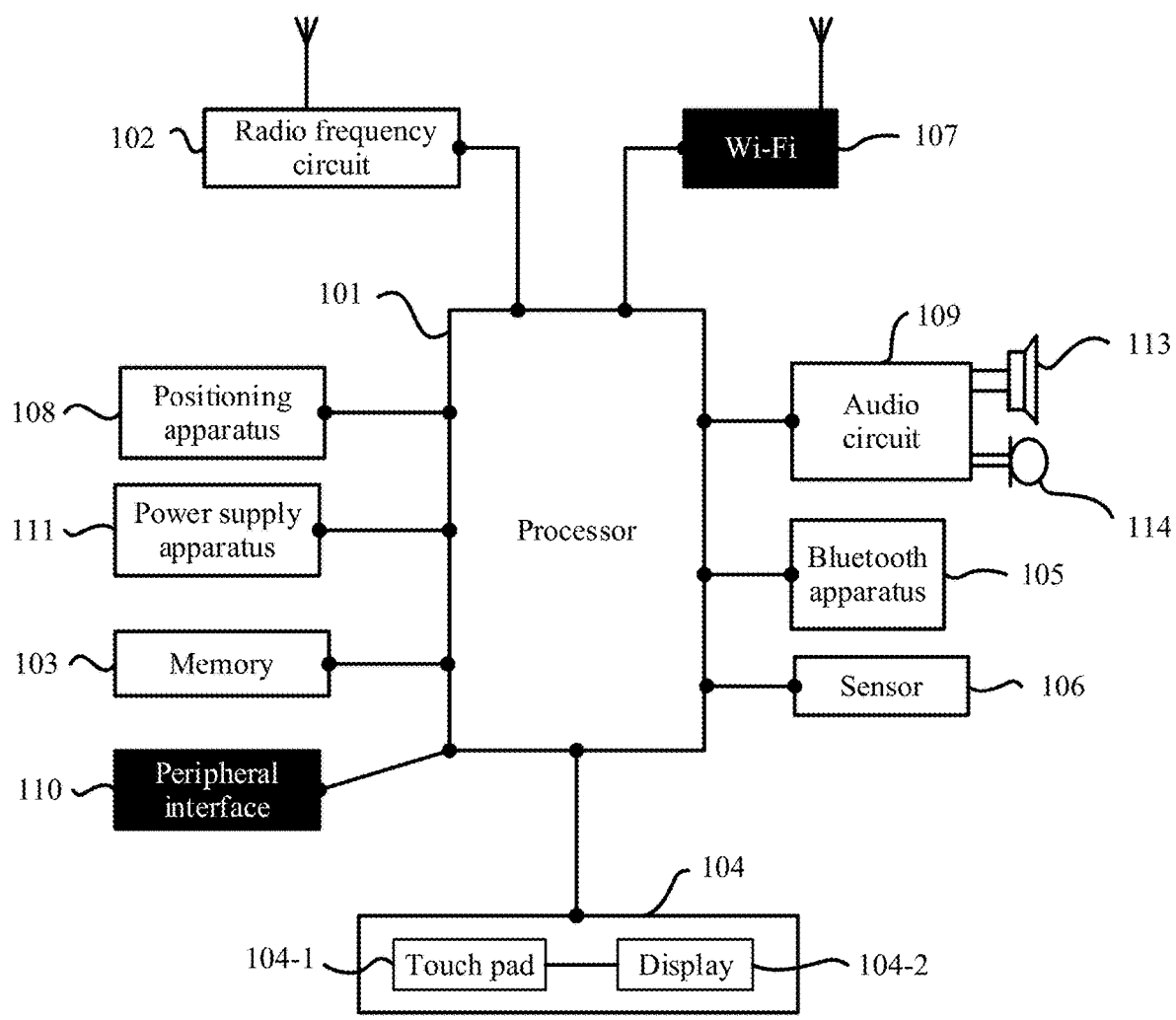
FIG. 1 is a schematic structural diagram 1 of a terminal according to an embodiment of this application.

As shown in FIG. 1, the terminal in the embodiments of this application may be the mobile phone 100. The mobile phone 100 is used as an example below to describe the embodiments in detail. It should be understood that the mobile phone 100 shown in the figure is merely an example of the terminal, and the mobile phone 100 may have more or fewer components than those shown in the figure, or combine two or more components, or have different component configurations. Various components shown in the figure may be implemented in hardware that includes one or more signal processing or application-specific integrated circuits, in software, or in a combination of hardware and software.

As shown in FIG. 1, the mobile phone 100 may include components such as a processor 101, a radio frequency (radio frequency, RF) circuit 102, a memory 103, a touchscreen 104, a Bluetooth apparatus 105, one or more sensors 106, a Wi-Fi 107, a positioning apparatus 108, an audio circuit 109, a peripheral interface 110, a power supply apparatus 111, and a fingerprint sensor 112. These components may perform communication by using one or more communications buses or signal cables (not shown in FIG. 1). A person skilled in the art may understand that a hardware structure shown in FIG. 1 does not constitute a limitation on the mobile phone 100. The mobile phone 100 may include more or fewer components than those shown in the figure, or combine some components, or have different component arrangements.

The following describes the components of the mobile phone 100 in detail with reference to FIG. 1.

The processor 101 is a control center of the mobile phone 100, is connected to all parts of the mobile phone 100 through various interfaces and lines, and executes various functions of the mobile phone 100 and processes data by running or executing an application stored in the memory 103 and invoking data and an instruction that are stored in the memory 103. In some embodiments, the processor 101 may include one or more processing units. An application processor and a modem processor may be alternatively integrated into the processor 101. The application processor mainly processes an operating system, a user interface, an application, and the like. The modem processor mainly processes wireless communication. It may be understood that, alternatively, the modem processor may not be integrated into the processor 101. For example, the processor 101 may be a multi-core processor.

The radio frequency circuit 102 may be configured to receive and send a radio signal in an information receiving and sending process or in a call process. Specifically, after receiving downlink data from a base station, the radio frequency circuit 102 may send the downlink data to the processor 101 for processing. In addition, the radio frequency circuit 102 sends uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. Any communications standard or protocol may be used for the wireless communication, and includes but is not limited to a global system for mobile communications, a general packet radio service, code division multiple access, wideband code division multiple access, long term evolution, an email, a messaging service, and the like.

The memory 103 is configured to store an application and data. The processor 101 executes various functions of the mobile phone 100 and processes data by running the application and the data stored in the memory 103. The memory 103 may include a program storage area and a data storage area. The program storage area may store an operating system, and an application required by at least one function (for example, a sound play function or an image play function). The data storage area may store data (for example, audio data or a phone book) created based on use of the mobile phone 100. In addition, the memory 103 may include a high-speed random access memory, or may include a nonvolatile memory such as a magnetic disk storage device, a flash storage device, or another storage device. The memory 103 may store various operating systems such as an iOS® operating system developed by Apple and an Android® operating system developed by Google.

The touchscreen 104 may include a touch-sensitive surface 104-1 and a display 104-2.

The touch-sensitive surface 104-1 (for example, a touch panel) may collect a touch event performed by a user of the mobile phone 100 on or near the touch-sensitive surface 104-1 (for example, an operation performed by the user on the touch-sensitive surface 104-1 or near the touch-sensitive surface 104-1 by using any proper object such as a finger or a stylus), and send collected touch information to another component, for example, the processor 101. The touch-sensitive surface 104-1 may include two parts: a touch detection apparatus and a touch controller. The touch detection apparatus detects a touch direction of the user, detects a signal brought by a touch operation, and transfers the signal to the touch controller. The touch controller receives touch information from the touch detection apparatus, converts the touch information into coordinates of a touch point, and then sends the coordinates to the processor 101. The touch controller may further receive and execute an instruction sent by the processor 101. In addition, the touch-sensitive surface 104-1 may be implemented by using a plurality of types such as a resistive type, a capacitive type, an infrared ray, and a surface acoustic wave.

The display (also referred to as a display screen) 104-2 may be configured to display information entered by the user or information provided for the user, and various menus of the mobile phone 100. The display 104-2 can be configured in a form of a liquid crystal display, an organic light emitting diode, or the like. The touch-sensitive surface 104-1 may cover the display 104-2. When detecting a touch event on or near the touch-sensitive surface 104-1, the touch-sensitive surface 104-1 transfers the touch event to the processor 101 to determine a type of the touch event. Then, the processor 101 may provide corresponding visual output on the display 104-2 based on the type of the touch event. Although in FIG. 1, the touch-sensitive surface 104-1 and the display screen 104-2 are used as two independent parts to implement input and output functions of the mobile phone 100, in some embodiments, the touch-sensitive surface 104-1 and the display screen 104-2 may be integrated to implement the input and output functions of the mobile phone 100. It may be understood that the touchscreen 104 is formed by stacking a plurality of layers of materials. In this embodiment of this application, only the touch-sensitive surface (layer) and the display screen (layer) are displayed, and another layer is not recorded in this embodiment of this application. In addition, in some other embodiments of this application, the touch-sensitive surface 104-1 may cover the display 104-2, and a size of the touch-sensitive surface 104-1 is greater than a size of the display screen 104-2. Therefore, the display screen 104-2 is entirely covered by the touch-sensitive surface 104-1. Alternatively, the touch-sensitive surface 104-1 may be configured on the front of the mobile phone 100 in a full panel form, and any touch performed by the user on the front of the mobile phone 100 can be sensed by the mobile phone. In this way, full touch control experience on the front of the mobile phone can be implemented. In some other embodiments, the touch-sensitive surface 104-1 is configured on the front of the mobile phone 100 in a full panel form, and the display screen 104-2 may also be configured on the front of the mobile phone 100 in a full panel form. In this way, a bezel-less structure can be implemented on the front of the mobile phone. In some other embodiments of this application, the touchscreen 104 may further include one or more groups of sensor arrays, so that the touchscreen 104 can sense pressure applied by the user on the touchscreen 104 while sensing a touch event performed by the user on the touchscreen 104.

The mobile phone 100 may further include the Bluetooth apparatus 105, configured to implement short-range data exchange between the mobile phone 100 and another terminal (for example, a mobile phone or a smartwatch). The Bluetooth apparatus in this embodiment of this application may be an integrated circuit, a Bluetooth chip, or the like.

The mobile phone 100 may further include at least one sensor 106, such as a light sensor, a motion sensor, and other sensors. Specifically, the light sensor may include an ambient light sensor and a proximity sensor. The ambient light sensor may adjust luminance of the display of the touchscreen 104 based on brightness of ambient light, and the proximity sensor may power off the display when the mobile phone 100 moves to an ear. As one type of motion sensor, an accelerometer sensor may detect values of accelerations in all directions (usually, three axes), may detect a value and a direction of gravity when the accelerometer sensor is stationary, and may be used in an application for identifying a mobile phone posture (for example, screen switching between a landscape mode and a portrait mode, a related game, or magnetometer posture calibration), a function related to vibration identification (for example, a pedometer or a knock), and the like. Other sensors such as a fingerprint recognition component, a gyroscope, a barometer, a hygrometer, a thermometer, and an infrared sensor that may be further configured on the mobile phone 100 are not described herein.

The Wi-Fi 107 is configured to provide, for the mobile phone 100, network access that complies with a Wi-Fi-related standard protocol. The mobile phone 100 may access a Wi-Fi access point by using the Wi-Fi 107, to help the user receive and send an email, browse a web page, access streaming media, and the like. The Wi-Fi 107 provides a wireless broadband Internet access for the user. In some other embodiments, the Wi-Fi 107 may also be used as a Wi-Fi wireless access point, and may provide Wi-Fi network access for another terminal.

The positioning apparatus 108 is configured to provide a geographic location for the mobile phone 100. It may be understood that the positioning apparatus 108 may be specifically a receiver of a positioning system such as a global positioning system (global positioning system, GPS) or a BeiDou navigation satellite system. After receiving a geographic location sent by the positioning system, the positioning apparatus 108 sends the information to the processor 101 for processing, or sends the information to the memory 103 for storage. In some other embodiments, the positioning apparatus 108 may be a receiver of an assisted global positioning system (assisted global positioning system, AGPS). The AGPS is a running manner of performing GPS positioning with specific assistance. The AGPS may enable positioning of the mobile phone 100 to be faster by using a signal of a base station in combination with a GPS satellite signal. In the AGPS system, the positioning apparatus 108 may obtain positioning assistance by communicating with an assisted positioning server (for example, a mobile phone positioning server). The AGPS system is used as an assisted server to assist the positioning apparatus 108 in completing ranging and positioning services. In this case, the assisted positioning server provides positioning assistance by communicating with a terminal such as the positioning apparatus 108 (a GPS receiver) of the mobile phone 100 by using a wireless communications network.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, a display externally connected to the mobile phone 100, an external memory, or a subscriber identity module card). For example, the mobile phone 100 is connected to the mouse through a universal serial bus interface, and is electrically connected, by using a metal contact on a card slot of the subscriber identity module card, to the subscriber identity module (subscriber identity module, SIM) card provided by a telecommunications operator. The peripheral interface 110 may be configured to couple the external input/output peripheral device to the processor 101 and the memory 103.

The mobile phone 100 may further include the power supply apparatus 111 (for example, a battery or a power supply management chip) that supplies power to the components. The battery may be logically connected to the processor 101 by using the power supply management chip, so that functions such as charging management, discharging management, and power consumption management are implemented by using the power supply apparatus 111.

Although not shown in FIG. 1, the mobile phone 100 may further include a camera, a flash, a micro projection apparatus, a near field communication (near field communication, NFC) apparatus, and the like. Details are not described herein.

In this embodiment of this application, data may be transmitted between two terminals (for example, a mobile phone A and a mobile phone B) based on a wired connection or a wireless connection, or based on both a wired connection and a wireless connection.

Figure 2:
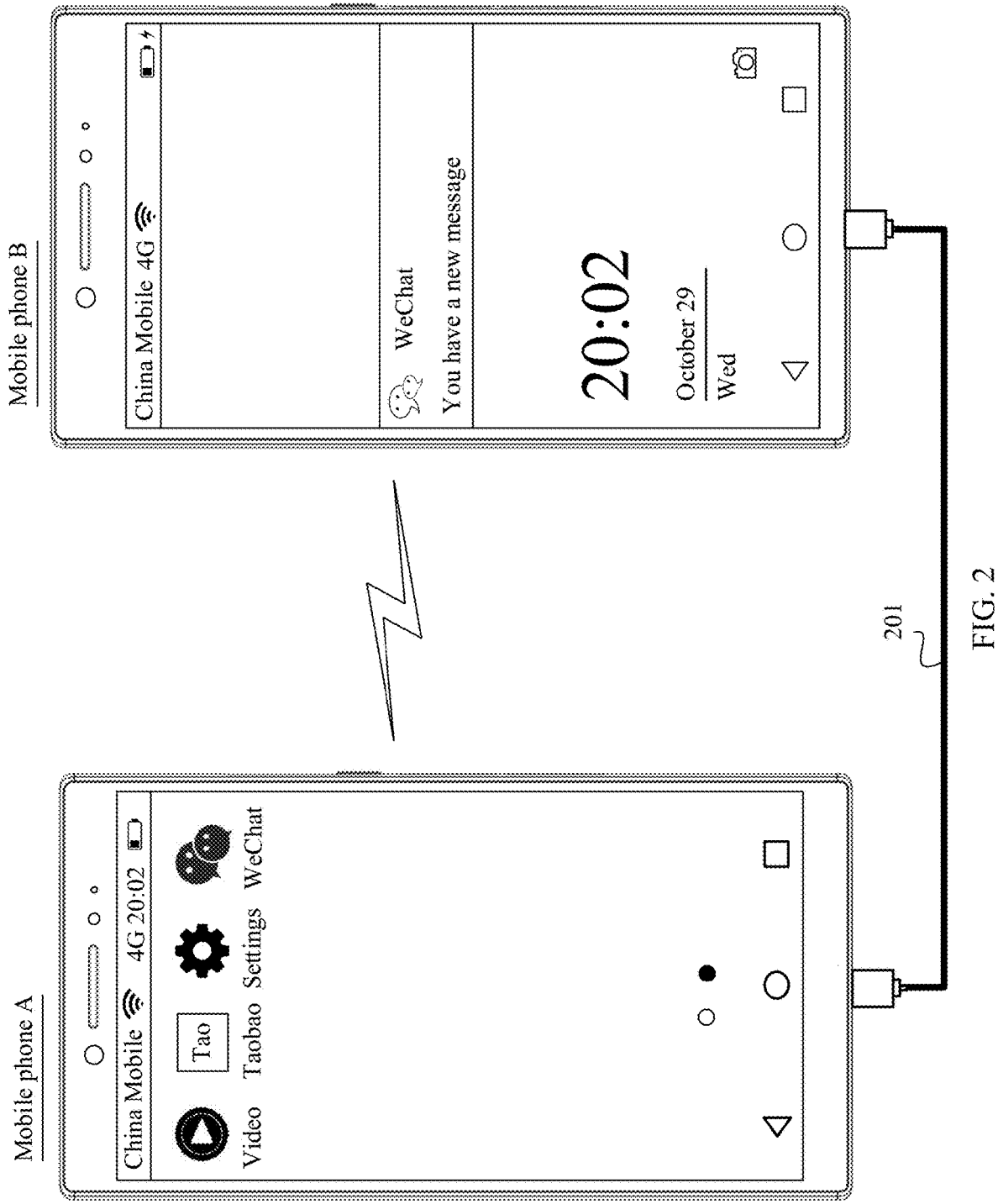
FIG. 2 is a schematic scenario diagram 1 of a data transmission method according to an embodiment of this application.

For example, the mobile phone A and the mobile phone B each have a Wi-Fi function. As shown in FIG. 2, the mobile phone A may access a Wi-Fi access point through Wi-Fi of the mobile phone A, and the mobile phone B may also access the Wi-Fi access point through Wi-Fi of the mobile phone B. In this way, data may be transmitted between the mobile phone A and the mobile phone B. Certainly, the mobile phone A and the mobile phone B may alternatively establish a WLAN direct connection through respective Wi-Fi. In this case, when data is being transmitted between the mobile phone A and the mobile phone B, no additional Wi-Fi access point is required for forwarding. Alternatively, the mobile phone A (or the mobile phone B) may serve as a Wi-Fi access point to establish a wireless connection to another mobile phone, to transmit data through the wireless connection. Certainly, the mobile phone A and the mobile phone B may alternatively establish a wireless connection by using Bluetooth, NFC, a 4G network, a 5G network, or the like. This is not limited in this embodiment of this application.

For another example, the mobile phone A and the mobile phone B each have a USB interface (the USB interface is one type of peripheral interface). Still as shown in FIG. 2, a wired connection between the mobile phone A and the mobile phone B may be established by using a USB data cable 201 that adapts to both USB interfaces of the mobile phone A and the mobile phone B.

A type of the USB interface may be specifically a USB Type A interface, a USB Type B interface, a Micro USB interface, a Mini USB interface, a USB Type C interface, or the like. This is not limited in this embodiment of this application.

Interfaces at two ends of the data cable 201 need to separately adapt to the USB interfaces of the mobile phone A and the mobile phone B. For example, if the USB interfaces of the mobile phone A and the mobile phone B are both USB Type-C interfaces, a Type C to Type C (C-to-C) direct-connection data cable may be used to connect the USB interfaces of the mobile phone A and the mobile phone B. Alternatively, when the interfaces at the two ends of the data cable 201 are not both USB Type C interfaces, for example, one end of the USB data cable 201 is a USB Type C interface, and the other end of the USB data cable 201 is a USB Type A interface, the USB Type A interface of the USB data cable 201 may be converted into a USB Type C interface by using an OTG (On The Go) connector, to implement a wired connection between the mobile phone A and the mobile phone B.

In addition, data may be transmitted between the mobile phone A and the mobile phone B through the USB data cable 201 based on any type of USB specification such as USB 1.0, USB 2.0, USB 3.0, or USB 3.1. This is not limited in this embodiment of this application.

In other words, in this embodiment of this application, when a user needs to transmit data between two terminals, two transmission channels in total: a wired connection and a wireless connection may be established between the two terminals. For example, when the user wants to transmit data in an old mobile phone to a new mobile phone, the user may connect the old mobile phone to the new mobile phone through a data cable of a corresponding interface to establish a USB connection, and may establish a Wi-Fi connection between the old mobile phone and the new mobile phone by using a Wi-Fi function. In this way, the old mobile phone may simultaneously transmit data to the new mobile phone through the two transmission channels: the USB connection and the Wi-Fi connection, thereby greatly increasing a speed of data transmission between terminals.

In addition, because there are the two transmission channels: the USB connection and the Wi-Fi connection between the old mobile phone and the new mobile phone, when either transmission channel is interrupted (for example, the Wi-Fi connection is disconnected), a transmit end may continue to transmit data through the other transmission channel (for example, the USB connection), thereby ensuring stability during data transmission.

For example, the memory 120 of the mobile phone 100 may store an Android® operating system, and the operating system is a Linux-based mobile device operating system, and implements various functions in combination with the foregoing hardware in the mobile phone 100. A software architecture of the stored Android® operating system is described below in detail. It should be noted that in the embodiments of this application, the Android® operating system is merely used as an example to describe a software environment required for implementing the technical solutions of the embodiments by the terminal. A person skilled in the art may understand that the embodiments of this application may be implemented by using another operating system such an iOS operating system.

Figure 3:
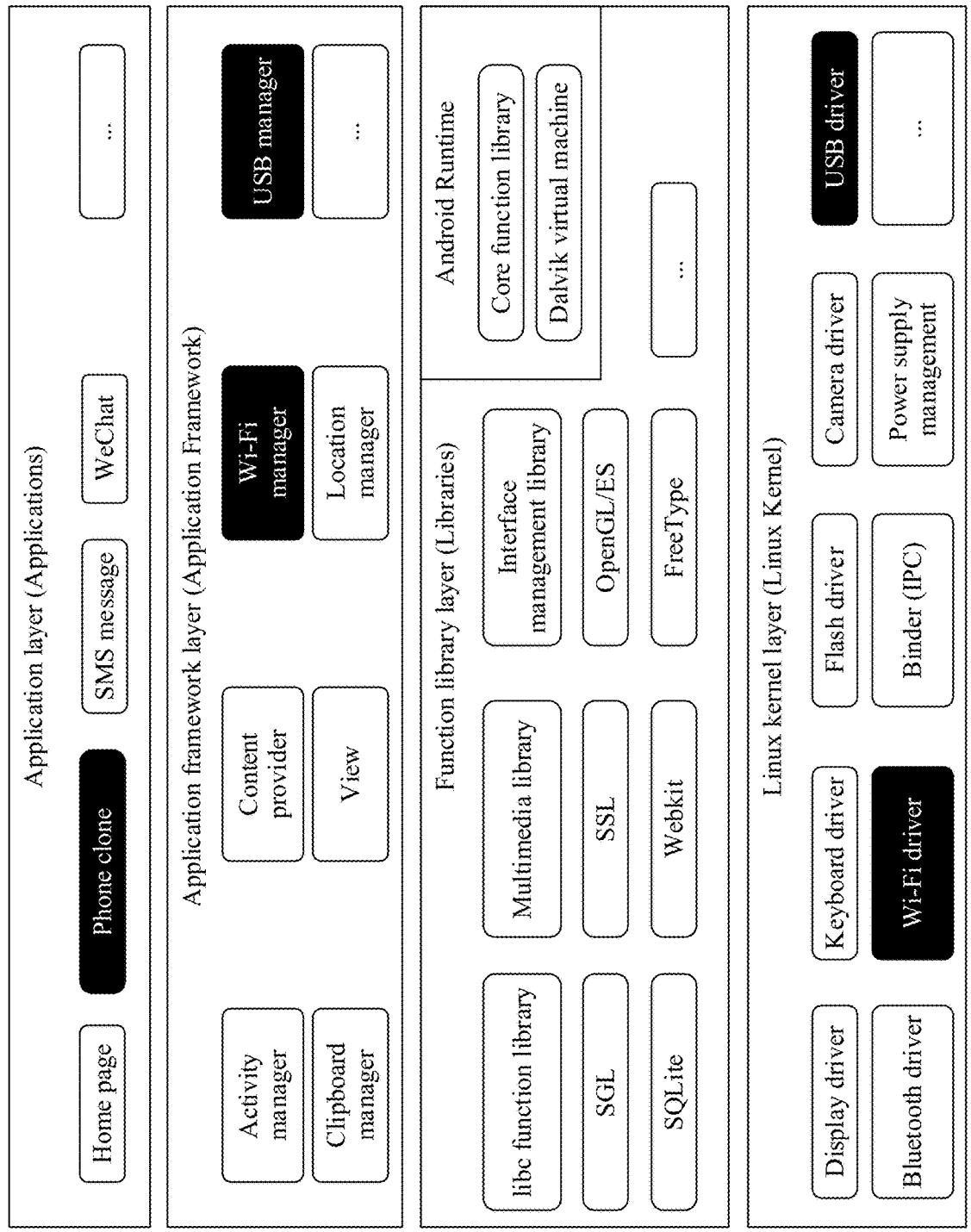
FIG. 3 is a schematic architectural diagram of an operating system in a terminal according to an embodiment of this application.

For example, FIG. 3 is a schematic diagram of a software architecture of an Android® operating system that can run in the foregoing terminal. The software architecture may be divided into four layers: an application layer, an application framework layer, a function library layer, and a Linux kernel layer.

1. Application (Applications) Layer

The application layer is an uppermost layer of the operating system, and includes native applications in the operating system, such as an email client, Messages, Phone, Calendar, Browser, and Contacts. Certainly, a developer may compile an application, and install the application at the layer.

The application may be usually developed by using a Java language, and this is completed by invoking an application programming interface (application programming interface, API) provided by the application framework layer.

2. Application Framework (Application Framework) Layer

The application framework layer mainly provides the developer with various APIs that may be used to access an application. The developer may interact with a bottom layer (for example, a function library or a Linux kernel) of the operating system by using an application framework, to develop an own application. The application framework mainly includes a series of services and management systems of the Android operating system. The application framework mainly includes the following basic services:

An activity manager (Activity Manager) is used to manage a life cycle of an application, and provide a commonly-used navigation back function;

a content provider (Content Providers) is used to manage data sharing and access between different applications;

a notification manager (Notification Manager) is used to control an application to display prompt information (for example, an alert (Alerts) or a notification (Notifications)) on a status bar, a lock screen interface, or the like to a user;

a clipboard manager (Clipboard Manager) mainly provides a copying or pasting function inside an application or between applications;

a view (View) has abundant and extensible view sets, may be used to construct an application, and specifically includes a list (list), a grid (grid), a text (text), a button (button), an image (mage), and the like; and a location manager (Location Manager) mainly enables an application to access a geographic location of the terminal.

3. Function Library (Libraries) Layer

The function library layer is a support of the application framework, and is an important link that connects the application framework layer to the Linux kernel layer. The function library layer includes some function libraries compiled by using a computer programming language C or C++. These function libraries can be used by different components in the operating system, and provide services for the developer by using the application framework layer. Specifically, the function libraries may include a libc function library, and the libc function library is specially customized for a device that is based on embedded Linux. The function libraries may further include a multimedia library (Media Framework), and the library supports playback and recording of audio or videos in a plurality of encoding formats, and also supports a still image file and a common audio or video encoding format. The function libraries further include an interface management library (Surface Manager). The interface management library is mainly responsible for managing access to a display system, is specifically used to be responsible for managing interaction between a display operation and an access operation when a plurality of applications are executed, and is further responsible for display composition of a 2D drawing and a 3D drawing.

The function library layer may further include other function libraries used to implement functions of a mobile phone, such as an SGL (Scalable Graphics Library) that is an XML (Extensible Markup Language) file-based 2D graph and image processing engine; an SSL (Secure Sockets Layer) that is located between a TVP/IP protocol and various application layer protocols, to provide a support for data communication; OpenGL/ES that supports a 3D effect; SQLite that is a relational database engine; Webkit that is a web browser engine; and FreeType that supports a bitmap and a vector font.

Android Runtime is a runtime environment in the Android® operating system, and is a new virtual machine used in the Android® operating system. An AOT (Ahead-Of-Time) technology is used in Android Runtime. When an application is installed for the first time, a bytecode of the application is precompiled into a machine code, so that the application becomes a real local application. Then, a compilation step is omitted when the application runs again, so that both starting and execution become faster.

In some other embodiments of this application, Android Runtime may be alternatively replaced with a core function library (Core Libraries) and a Dalvik virtual machine (Dalvik Virtual Machine). The core function library provides most functions of an API in the Java language, and mainly provides, for the application framework layer in a Java native interface (Java native interface, JNI) manner, an interface for invoking a bottom-layer program library. In addition, the core function library further includes some core APIs of the operating system, such as Android.os, Android.net, and Android.media. The Dalvik virtual machine uses a JIT (Just-in-Time) runtime compilation mechanism. The virtual machine needs to recompile a bytecode on the background each time a process is started, and this affects a starting speed. Each application runs in one Dalvik virtual machine instance, and each Dalvik virtual machine instance is independent process space. The Dalvik virtual machine is designed to enable a plurality of virtual machines to run in one device efficiently. The Dalvik virtual machine may execute a file format .dex. The dex format is a compression format specially designed for Dalvik, and is suitable for a system having limited memory and a limited processor speed. It should be noted that, the Dalvik virtual machine depends on the Linux kernel to provide a basic function (thread and bottom-layer memory management). It may be understood that Android Runtime and Dalvik belong to different types of virtual machines, and a person skilled in the art may select different forms of virtual machines in different cases.

4. Linux Kernel (Linux Kernel) Layer

This layer provides a core system service of the operating system. For example, security, memory management, process management, a network protocol stack, and a driver model are all based on the Linux kernel. The Linux kernel is also used as an abstract layer between hardware and a software stack. This layer has many drivers related to a mobile device, and has the following main drivers: a display driver, a Linux-based frame buffer driver, a keyboard driver that is used as an input device, a flash driver that is based on a memory technology device, a camera driver, a Bluetooth driver, a Wi-Fi driver, a USB driver, and the like.

In this embodiment of this application, still as shown in FIG. 3, one or more data transmission applications used to transmit data between terminals are installed at the application layer, for example, a Phone Clone APP and a HuanJi APP. In addition, the application framework layer further includes a Wi-Fi manager (Wi-Fi Manager) and a USB manager (USB Manager). Taking the Phone Clone APP as an example, the Phone Clone APP may interact with the Wi-Fi manager and the USB manager by invoking a corresponding API. In this way, when a data transmission service is provided for a user, the Phone Clone APP may serve as a decision maker to control the Wi-Fi manager and the USB manager, and a dual-channel data transmission mode in which data is simultaneously transmitted on a Wi-Fi connection and a USB connection may be implemented.

When an application (for example, the Phone Clone APP) at the application layer needs to use a Wi-Fi function, the Wi-Fi manager at the application framework layer may be invoked by using a function: Context.getSystemService (Context.WiFi_SERVICE), and the Wi-Fi manager may further discover and manage another device that uses the Wi-Fi function by invoking a Wi-Fi driver at the kernel layer, for example, enabling or disabling the Wi-Fi function, scanning a Wi-Fi network, and establishing a Wi-Fi connection.

When an application (for example, the Phone Clone APP) at the application layer needs to use a USB function, the USB manager at the application framework layer may be invoked by using a function: Context.getSystemService (Context.USB_SERVICE), and the USB manager may further discover and manage another USB device by invoking a USB driver at the kernel layer, for example, scanning the USB device and detecting a plug-pull event of the USB device.

The USB manager may run in two working modes: a USBHostManager mode when serving as a host device and a USBDeviceManager mode when serving as a slave device. When a terminal (for example, the mobile phone A) is in a USBHostManager mode, it indicates that the mobile phone A is a USB host device (host), and the mobile phone A may supply power to another terminal (for example, the mobile phone B) connected to the mobile phone A through a USB data cable. In this case, the mobile phone B runs in a USBDeviceManager mode as a USB slave device (slave). It may be understood that the USBDeviceManager mode and the USBHostManager mode are a relative concept. Taking a mobile phone an example, when the mobile phone is connected to a PC through a USB data cable, the mobile phone is in a USBDeviceManager mode, and the mobile phone serves as a USB slave device. When the mobile phone is connected to a USB flash drive through a USB data cable, the mobile phone is in a USBHostManager mode, and the mobile phone serves as a USB host device.

For example, the USB manager may switch between the USBDeviceManager mode and the USBHostManager mode by invoking a function: public void setCurrentFunction (String function, boolean usbDataUnlocked). When switching to the USBDeviceManager mode, the USB manager may execute a function: public ParcelFileDescriptor openAccessory(UsbAccessory accessory) to connect to a slave device. When switching to the USBHostManager mode, the USB manager may execute a function: public UsbDeviceConnection openDevice(UsbDevice device) to connect to a host device and respond to an instruction sent by the host device.

Before a USB OTG protocol, a host-slave relationship between two ends of a USB data cable is usually definite. When a terminal is connected to an interface that serves as a USB host device on the USB data cable, a USB manager of the terminal is triggered to switch to a USBHostManager mode, and the terminal serves as a USB host device. When another terminal is connected to an interface that serves as a USB slave device on the USB data cable, a USB manager of the terminal is triggered to switch to a USBDeviceManager mode, and the terminal serves as a USB slave device. However, a host negotiation protocol (Host Negotiation Protocol, HNP for short) mechanism is introduced in the USB OTG protocol. Based on this mechanism, when establishing a USB connection, devices at the two ends of the USB data cable may negotiate to determine which party serves as a USB host device, and then the USB host device supplies power to the other party (a USB slave device). Therefore, when the USB data cable supporting HNP is used, a host-slave relationship between the devices at the two ends of the USB data cable may be determined by using the foregoing negotiation mechanism.

It should be noted that the foregoing host negotiation protocol mechanism is also used in the USB Type-C specification. A USB host device determined based on the USB Type-C specification may also be referred to as a source device, that is, a device that supplies power by using VBUS or VCONN, and a USB slave device determined based on the USB Type-C specification may also be referred to as a sink device, that is, a device that is supplied with power by using VBUS or VCONN. For ease of description, a USB host device and a USB slave device are used as an example for description in all subsequent embodiments.

In this embodiment of this application, when the user enables a Phone Clone APP in the mobile phone A, and the user enables a Phone Clone APP in the mobile phone B, the Phone Clone APP may prompt the user to establish a Wi-Fi connection and a USB connection to another transmit end (for example, the mobile phone B). Further, the Phone Clone APP may invoke the Wi-Fi manager at the application framework layer to detect and complete the Wi-Fi connection to the mobile phone B, and the Phone Clone APP may invoke the USB manager at the application framework layer to detect and complete the USB connection to the mobile phone B.

For example, the mobile phone A sends data to the mobile phone B. The mobile phone A may send one part of data selected by the user to the mobile phone B through the Wi-Fi connection, and send the other part of data selected by the user to the mobile phone B through the USB connection. Such a dual-channel data transmission method can significantly increase a data transmission speed. In addition, when the USB connection (or the Wi-Fi connection) is disconnected, the mobile phone A may further send data to the mobile phone B through the other channel, so that dynamic switching between single-channel transmission and dual-channel transmission can be implemented in a data transmission process, thereby improving data stability in the data transmission process.

For ease of understanding, the data transmission method provided in the embodiments of this application is specifically described below with reference to the accompanying drawings.

Figure 4:
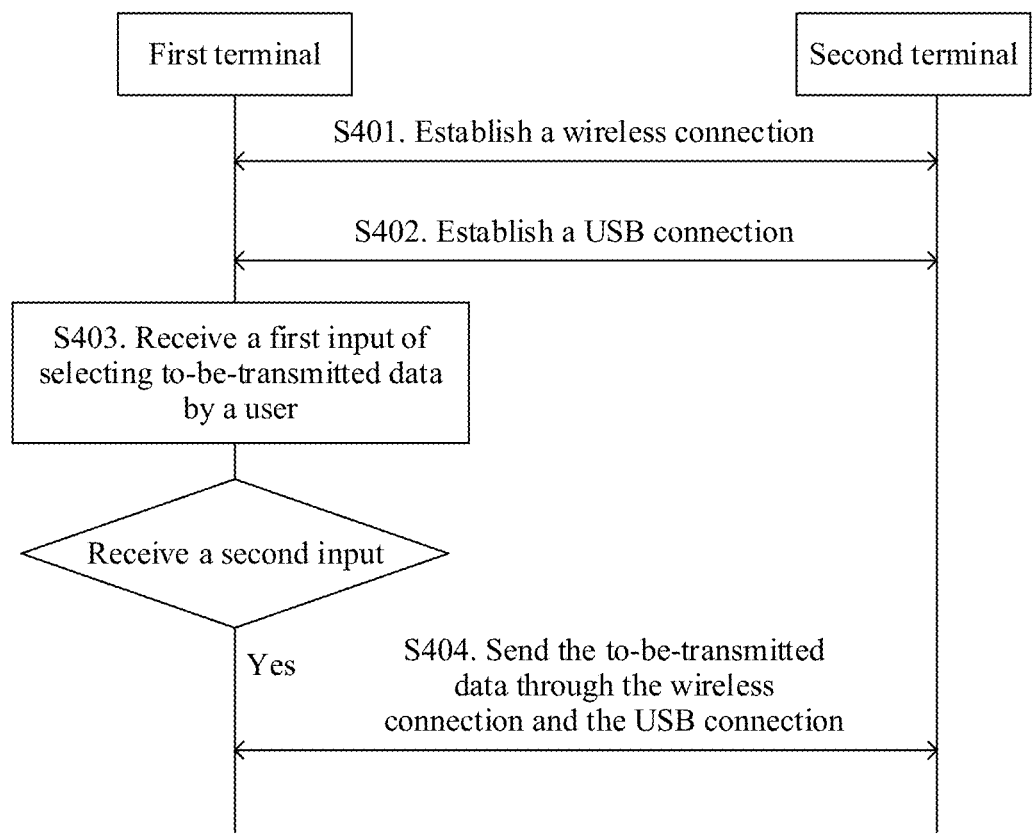
FIG. 4 is a schematic interaction diagram 1 of a data transmission method according to an embodiment of this application.

FIG. 4 is a schematic flowchart of a data transmission method according to an embodiment of this application. As shown in FIG. 4, the data transmission method may include the following steps.

S401: A first terminal establishes a wireless connection to a second terminal.

S402: The first terminal establishes a USB connection to the second terminal.

For example, the first terminal is an old mobile phone of a user, and the second terminal is a new mobile phone of the user. When the user wants to copy data in the old mobile phone to the new mobile phone, the user may separately enable a Phone Clone APP installed in the new mobile phone and a Phone Clone APP installed in the old mobile phone.

Figure 5:
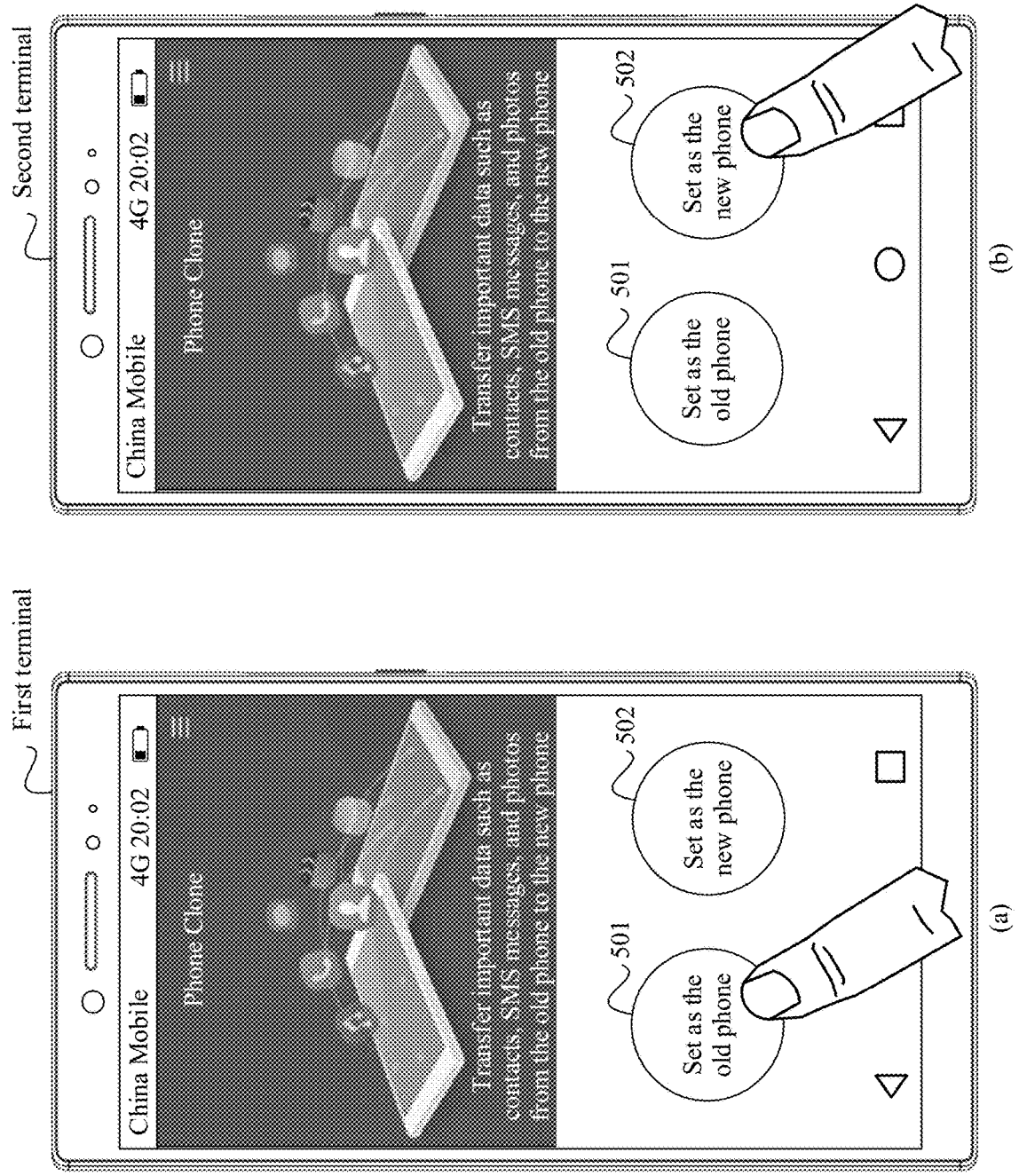
FIG. 5 is a schematic scenario diagram 2 of a data transmission method according to an embodiment of this application.

As shown in FIG. 5, a button 501 for setting a terminal as an old mobile phone and a button 502 for setting a terminal as a new mobile phone are displayed on a home page of the Phone Clone APP. As shown in (a) in FIG. 5, if it is detected that the user taps the button 501, it indicates that a terminal currently operated by the user is an old mobile phone (the first terminal), and subsequently the first terminal may serve as a transmit end to send data to a receive end (the second terminal) connected to the transmit end. As shown in (b) in FIG. 5, if it is detected that the user taps the button 502, it indicates that a terminal currently operated by the user is a new mobile phone (the second terminal), and subsequently the second terminal may serve as a receive end to receive data sent by a transmit end (the first terminal) connected to the receive end.

Figure 6:
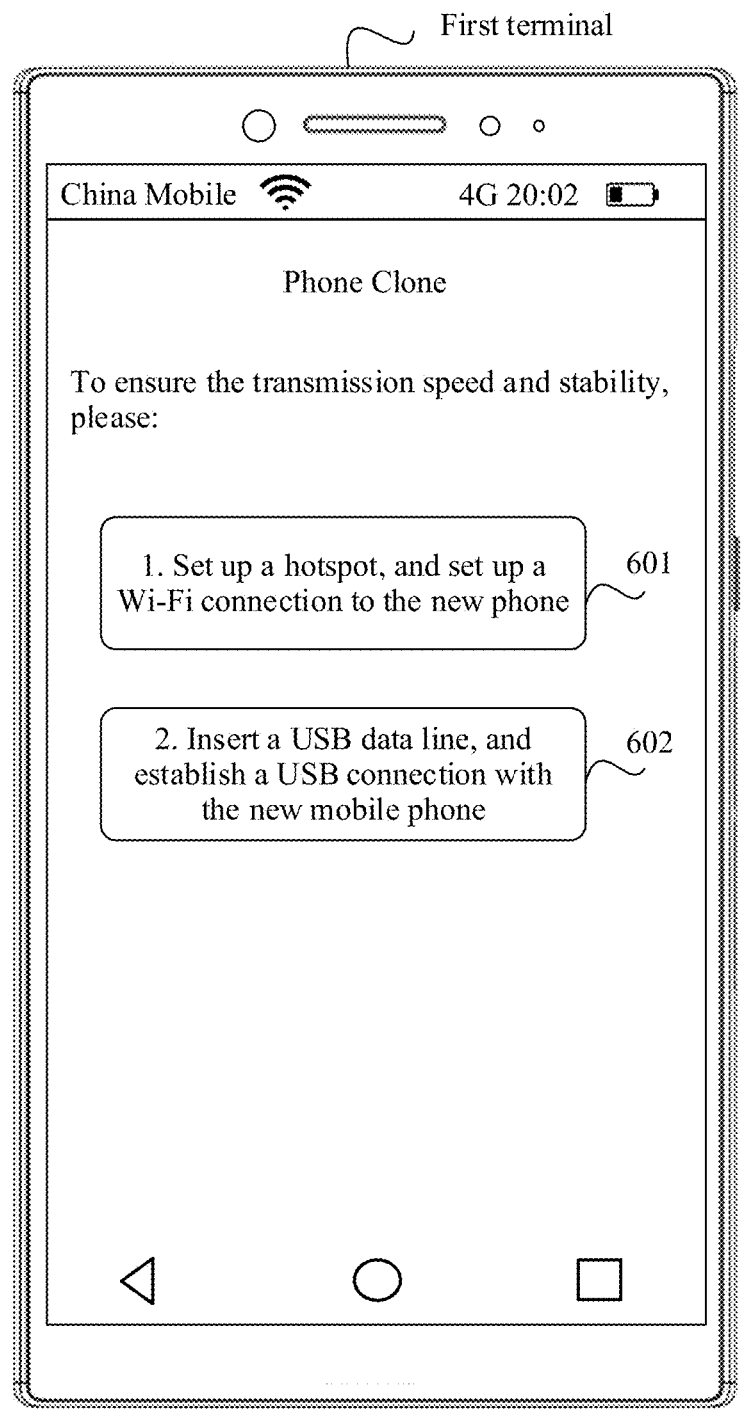
FIG. 6 is a schematic scenario diagram 3 of a data transmission method according to an embodiment of this application.

Further, as shown in FIG. 6, after the first terminal detects that the user taps the button 501 or the second terminal detects that the user taps the button 502, the first terminal (or the second terminal) may display a prompt 601 of establishing a wireless connection (for example, a Wi-Fi connection) between the new mobile phone and the old mobile phone and a prompt 602 of establishing a USB connection between the new mobile phone and the old mobile phone. The prompt 601 and the prompt 602 may be alternatively in a form of a two-dimensional code, an animation, a video, a voice, or the like. This is not limited in this embodiment of this application.

According to the prompt 601, the user may enable Wi-Fi functions of the new mobile phone and the old mobile phone and access a same Wi-Fi network, to establish the Wi-Fi connection between the new mobile phone and the old mobile phone. Alternatively, the user may enable WLAN direct connection functions of the new mobile phone and the old mobile phone, to establish the Wi-Fi connection between the new mobile phone and the old mobile phone by using the WLAN direct connection functions. Alternatively, the user may set the new mobile phone (or the old mobile phone) as a personal hotspot, and then establish the Wi-Fi connection between the new mobile phone and the old mobile phone after operating the other terminal to access the personal hotspot.

For example, after the second terminal detects that the user taps the button 502, the Phone Clone APP may invoke a Wi-Fi manager to automatically establish a personal hotspot, and display information such as a name and a password of the personal hotspot by using a two-dimensional code or the like. The Wi-Fi connection to the second terminal may be established after the user operates the first terminal to scan the two-dimensional code. In this case, the first terminal and the second terminal may not display the prompt 601.

Alternatively, after the first terminal detects that the user taps the button 501 and the second terminal detects that the user taps the button 502, if a terminal (for example, the first terminal) has enabled a Wi-Fi function and accessed a Wi-Fi network, the Phone Clone APP in the first terminal cannot determine whether the other end of a current Wi-Fi connection is a new mobile phone (the second terminal) that is ready to receive data. Therefore, the Phone Clone APP may instruct the first terminal to send an identity confirmation message to the other end of the current Wi-Fi connection, for example, query whether the other end of the current Wi-Fi connection is the new mobile phone that is ready to receive data. If the first terminal receives a correct response from the other end, it indicates that the first terminal has established the Wi-Fi connection to the second terminal currently. In this case, the first terminal and the second terminal may not display the prompt 601.

Correspondingly, according to the prompt 602, the user may connect the new mobile phone to the old mobile phone by using a USB data cable that adapts to both the new mobile phone and the old mobile phone, to establish the USB connection between the first terminal and the second terminal. For example, when USB interfaces of both the new mobile phone and the old mobile phone are of a USB Type-C type, the user may separately insert interfaces at two ends of a C-to-C direct-connection data cable into the USB interfaces of the new mobile phone and the old mobile phone. After detecting this connection event, the new mobile phone and the old mobile phone may determine, according to the host negotiation protocol (HNP), that one of the two mobile phones is a USB host device and the other is a USB slave device. For example, if the new mobile phone first detects that the old mobile phone is connected to the new mobile phone by using the USB data cable, the new mobile phone may notify the old mobile phone that the new mobile phone is a USB host device and the old mobile phone is a USB slave device. After the old mobile phone sends an acknowledgment message to the new mobile phone to confirm this host-slave relationship, the new mobile phone may run in a USB host device mode, and the old mobile phone may run in a USB slave device mode. In this case, the USB host device (for example, the new mobile phone) may supply power to the USB slave device (for example, the old mobile phone) by using the USB data cable.

Alternatively, after the first terminal detects that the user taps the button 501 and the second terminal detects that the user taps the button 502, if a terminal (for example, the first terminal) has detected that the terminal is connected to another USB device, the Phone Clone APP in the first terminal probably cannot determine whether the other end of a current USB connection is a new mobile phone (the second terminal) that is ready to receive data. Therefore, the Phone Clone APP may instruct the first terminal to send an identity confirmation message to the other end of the current USB connection, for example, query whether the other end of the current USB connection is the new mobile phone that is ready to receive data. If the first terminal receives a correct response from the other end, it indicates that the first terminal has established the USB connection to the second terminal currently. In this case, the first terminal and the second terminal do not need to display the prompt 602.

After the first terminal establishes the USB connection to the second terminal, a USBManager at an application framework layer in the first terminal may report, to a Phone Clone APP at an application layer, an event that the USB connection is established. Similarly, after the first terminal establishes the Wi-Fi connection to the second terminal, a WiFi-Manager at the application framework layer in the first terminal may report, to the Phone Clone APP at the application layer, an event that the Wi-Fi connection is established. After the Phone Clone APP determines that two transmission channels are currently established, the following steps S402 to S404 may be performed to transmit data through the two transmission channels, thereby increasing a speed of data transmission during phone clone.

In addition, after the first terminal establishes the USB connection to the second terminal, a terminal as a USB host device supplies power to a terminal as a USB slave device. Therefore, battery levels of devices at two ends of the USB connection change. The first terminal may obtain a power status of the second terminal and a power status of the first terminal, or the second terminal may obtain a power status of the first terminal and a power status of the second terminal. This is not limited in this embodiment of this application. The first terminal or the second terminal may obtain the power status of the other party by using the established USB connection or by using the established Wi-Fi connection.

For example, the first terminal obtains the power status of the first terminal. The Phone Clone APP may pre-register, with a PowerManager (a power manager) at the application framework layer, a condition for triggering the PowerManager to report a battery level. For example, the PowerManager is requested to periodically (for example, every 5 minutes) report a remaining battery level to the Phone Clone APP, or the PowerManager is requested to report a current remaining battery level to the Phone Clone APP each time it is detected that a battery level decreases by 10%. When detecting that a battery level of a terminal meets the condition pre-registered by the Phone Clone APP, the PowerManager may report a current remaining battery level to the Phone Clone APP. Similarly, the second terminal may also obtain the power status of the second terminal according to the foregoing method, and further send the power status of the second terminal to the first terminal by using the established Wi-Fi connection or USB connection.

Certainly, the PowerManager may enable a power query interface to the Phone Clone APP, and the Phone Clone APP may actively obtain a current power status by invoking the interface. This is not limited in this embodiment of this application.

It should be noted that in this embodiment, an example in which data is transmitted after the first terminal establishes the wireless connection and the USB connection to the second terminal is used for description. It may be understood that the first terminal may alternatively start to transmit data after establishing the wireless connection to the second terminal, and then the USB connection between the first terminal and the second terminal may be established in a data transmission process. Alternatively, the first terminal may start to transmit data after establishing the USB connection to the second terminal, and then the wireless connection between the first terminal and the second terminal may be established in a data transmission process. This is described in detail in a subsequent embodiment, and therefore details are not described herein.

It may be understood that in S401 and S402, S402 may be performed before S401. An order of steps S401 and S402 is not limited in this embodiment.

S403 The first terminal receives first input of selecting to-be-transmitted data by a user from the first terminal.

Figure 7A:
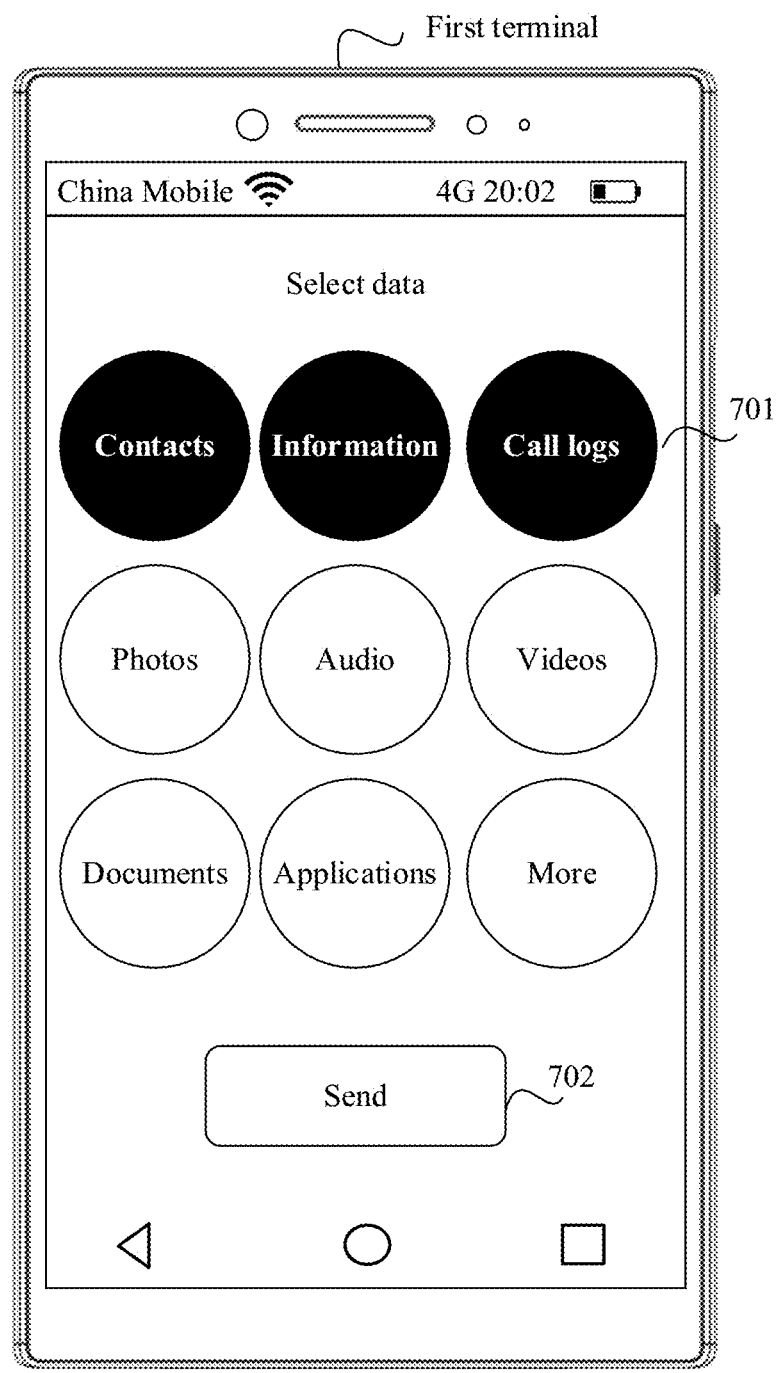
FIG. 7A is a schematic scenario diagram 4 of a data transmission method according to an embodiment of this application.

In step S403, as shown in FIG. 7A, after the first terminal serves as an old mobile phone (a transmit end) to detect that the wireless connection and the USB connection between the first terminal and the second terminal are established, the Phone Clone APP running in the first terminal may jump to an interface 701. The user may select, on the interface 701, to-be-transmitted data that needs to be sent to the second terminal (a receive end). For example, the interface 701 includes candidate data such as Contacts, Messages, Photos, Call logs, Music, and Applications. When an application is used as candidate data, the application may specifically include the application itself, and may further include recorded data and a stored file that are generated when the user uses the application, for example, a contact profile picture, a buffered picture, and a downloaded picture. The user may tap at least one of to-be-transmitted Contacts, Messages, Photos, Call logs, Music, and Applications on the interface 701 to select the to-be-transmitted data. In this case, selecting the candidate data by the user on the interface 701 may be used as the first input.

After detecting that the user performs the first input of selecting the to-be-transmitted data on the interface 701, the first terminal may further determine a transmission manner of the to-be-transmitted data. For example, the first terminal may transmit one part (for example, first data) of the to-be-transmitted data through the wireless connection, and transmit the other part (for example, second data) of the to-be-transmitted data through the USB connection.

For example, the first terminal may determine a data amount of the first data based on network quality of the wireless connection between the first terminal and the second terminal. For example, when a speed of a Wi-Fi network between the first terminal and the second terminal is less than a threshold, a small part of data may be determined to be transmitted through the Wi-Fi connection, and the remaining large part of data is determined to be transmitted through the USB connection. In this way, a transmission speed of the entire to-be-transmitted data can be improved.

Alternatively, the first terminal may determine a data amount of the first data based on a battery level of the first terminal and a battery level of the second terminal. For example, when it is detected that a battery level of a terminal connected to the USB data cable is less than 20% or a battery level difference between the first terminal and the second terminal is greater than 60%, the terminal consumes more power when transmitting data through the Wi-Fi connection. Therefore, the first terminal may determine that a small part of data is to be transmitted through the Wi-Fi connection, and determine that the remaining large part of data is to be transmitted through the USB connection. In this way, a probability that data transmission is interrupted because a terminal is powered off when power consumption of the terminal is excessively high in a data transmission process can be reduced.

Certainly, if it is detected that network quality of the Wi-Fi connection between the first terminal and the second terminal is relatively good but a transmission speed of the USB connection is relatively low, for example, the USB connection between the first terminal and the second terminal is implemented based on the USB 1.1 specification that supports a relatively low transmission speed, the first terminal may determine that a large part of data is to be transmitted through the Wi-Fi connection, and determine that the remaining small part of data is to be transmitted through the USB connection. In this way, a transmission speed of the to-be-transmitted data increases. In USB 1.1, a supported minimum speed (Low Speed) is 1.5 Mbit/s, and a full speed (Full Speed) is 12 Mbit/s. In USB 2.0, a high speed (High Speed) during full speed can reach 480 Mbit/s. In latest USB 3.0, 5 Gbit/s super-speed (Super Speed) transmission can be supported.

When specific data to be transmitted on the Wi-Fi connection and the USB connection is being determined, the Phone Clone APP in the first terminal may divide the to-be-transmitted data selected by the user into a plurality of data blocks. For example, 1 G to-be-transmitted data is divided into 1024 data blocks based on a size of 1 M, and each data block is numbered based on a division order. In this way, the first terminal may determine, according to the method in the foregoing embodiment, a quantity of data blocks to be transmitted through the Wi-Fi connection and a quantity of data blocks to be transmitted through the USB connection. The data block to be transmitted through the Wi-Fi connection may be first data, and the data block to be transmitted through the USB connection may be second data. For example, when a speed of the USB connection is relatively high but quality of the Wi-Fi connection is poor, 800 data blocks may be transmitted through the USB connection, and 224 data blocks may be transmitted through the Wi-Fi connection. Certainly, the Phone Clone APP may dynamically determine a transmission manner of each data block in a transmission process based on factors such as a power status, a Wi-Fi network speed, and a USB transmission speed. Subsequently, after receiving data blocks sent in the two sending manners, the second terminal may restore the 1G to-be-transmitted data based on a number of each data block.

In addition, the foregoing embodiment is described by using an example in which the first terminal (for example, the Phone Clone APP running in the first terminal) automatically determines the transmission manner of the to-be-transmitted data. In some other embodiments of this application, the transmission manner of the to-be-transmitted data may be manually selected by the user.

Figure 7B:
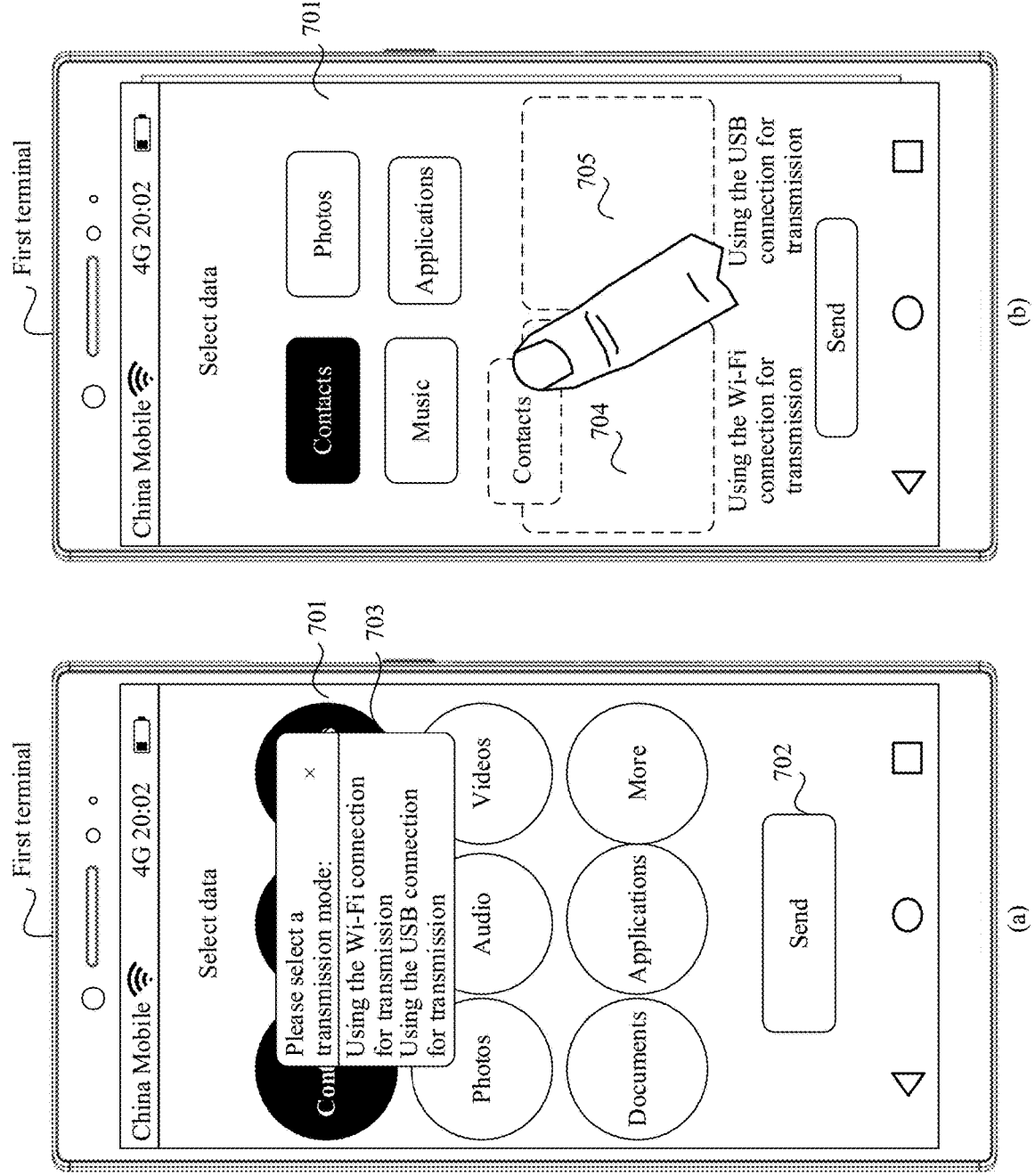
FIG. 7B is a schematic scenario diagram 5 of a data transmission method according to an embodiment of this application.

For example, as shown in (a) in FIG. 7B, a selection box 703 may pop up after the user selects each piece of to-be-transmitted data on the interface 701, so that the user can choose, in the selection box 703, whether to transmit the piece of to-be-transmitted data through the Wi-Fi connection or the USB connection. For another example, as shown in (b) in FIG. 7B, the interface 701 includes a region 704 corresponding to the Wi-Fi connection and a region 705 corresponding to the USB connection. The user may drag each piece of to-be-transmitted data that needs to be transmitted into a corresponding region, to select a transmission manner of the piece of to-be-transmitted data. For example, the user drags the piece of to-be-transmitted data: Contacts into the region 704, that is, instructs the first terminal to transmit the piece of to-be-transmitted data through the Wi-Fi connection. In this case, the operation of dragging the piece of to-be-transmitted data: Contacts into the region 704 by the user may be used as the first input.

S404. The first terminal sends the to-be-transmitted data to the second terminal through the wireless connection and the USB connection in response to second input performed by the user on the first terminal.

In step S404, if it is detected that the user performs, on the first terminal, the second input of sending the to-be-transmitted data, for example, the user taps a sending button 702 on the interface 701, the first terminal may serve as an old mobile phone (a transmit end) to transmit one part (the first data) of the to-be-transmitted data to the second terminal through the established wireless connection (for example, the Wi-Fi connection). In addition, the first terminal may further transmit the other part (the second data) of the to-be-transmitted data to the second terminal through the established USB connection. In this way, the first terminal may simultaneously transmit data to the new mobile phone through the two transmission channels: the USB connection and the Wi-Fi connection, thereby greatly increasing a speed of data transmission between terminals.

It should be noted that the second input of sending the to-be-transmitted data and the first input of selecting the to-be-input data may be two independent gestures performed by the user. For example, the first input may be a tap gesture of tapping candidate data such as Contacts on the interface 701 by the user, and the second input is a tap gesture of tapping the sending button 702 by the user.

Alternatively, the second input and the first input may be two phases of one gesture performed by the user. As shown in (a) in FIG. 8, if it is detected that a finger of the user touches and holds the piece of to-be-transmitted data: Contacts 801 (which is the first input), the first terminal may determine that the user selects Contacts 801 as the to-be-transmitted data. In this case, as shown in (b) in FIG. 8, if it is detected that the finger of the user does not leave a touchscreen but continues to drag the piece of to-be-transmitted data: Contacts 801 into a sending region 802 and then is released (which is the second input), the first terminal may determine that the user expects to send the piece of to-be-transmitted data: Contacts 801, and perform step S404.

Figure 8:
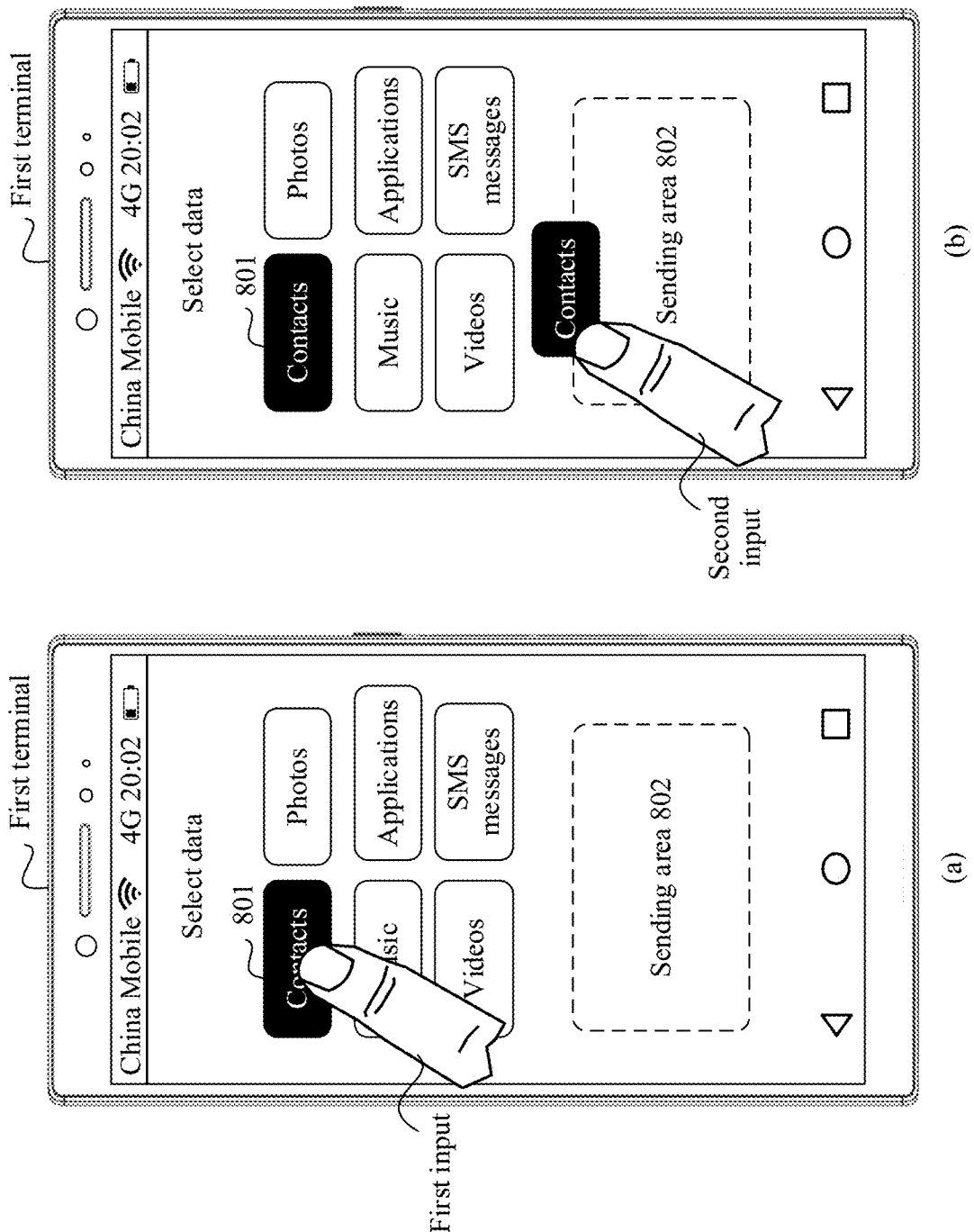
FIG. 8 is a schematic scenario diagram 6 of a data transmission method according to an embodiment of this application.

It may be understood that, still referring to (b) in FIG. 8, if it is detected that the finger of the user touches and holds the piece of to-be-transmitted data: Contacts 801, when the finger of the user does not leave the touchscreen but continues to drag the piece of to-be-transmitted data: Contacts 801 into the sending region 802 (in other words, the user touches and holds Contacts and drags Contacts into the sending region but is not released, which may be understood as the first input), and then is released (which may be understood as the second input), the first terminal may determine that the user expects to send the piece of to-be-transmitted data: Contacts 801, and perform step S404.

Figure 9:
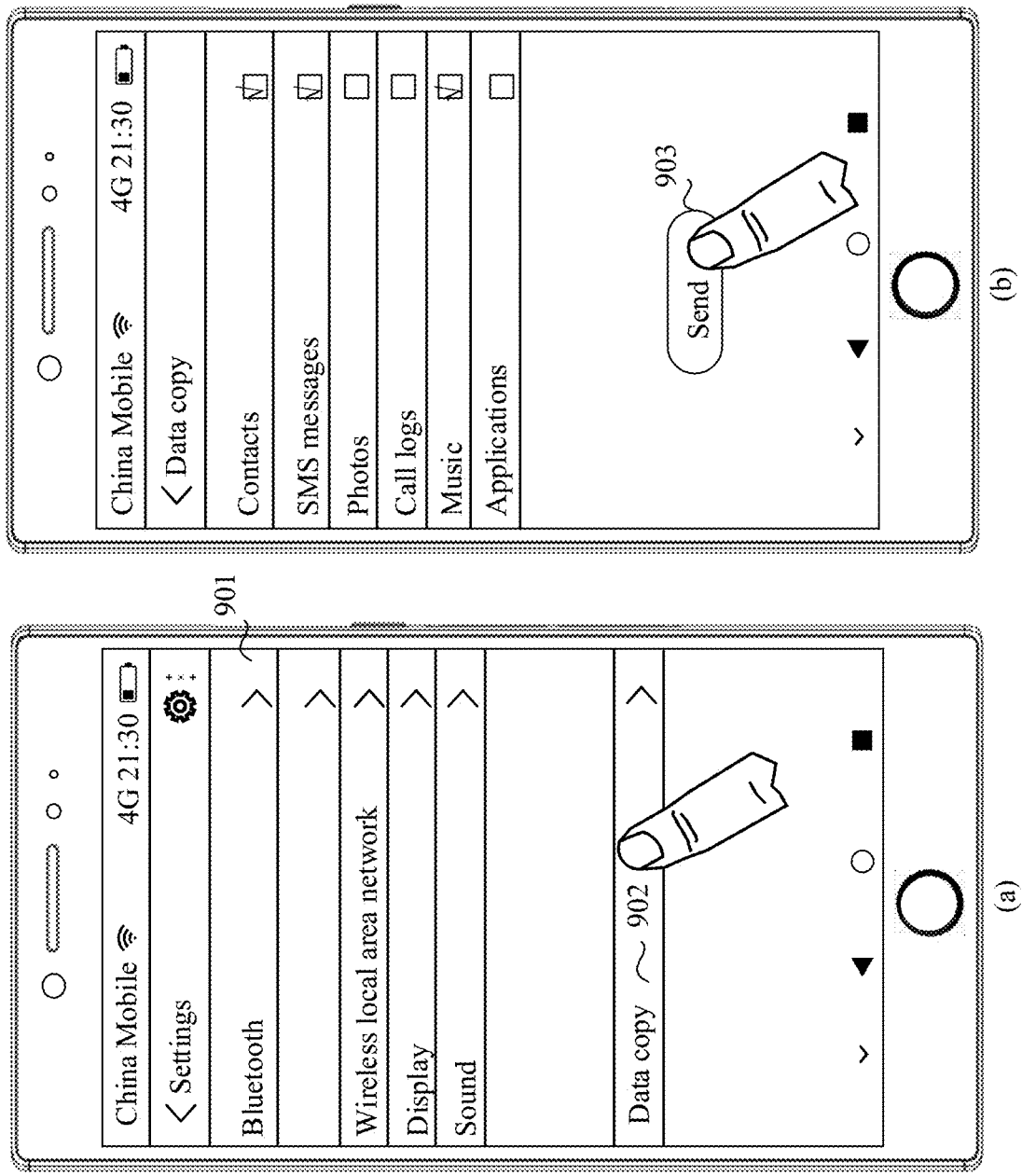
FIG. 9 is a schematic scenario diagram 7 of a data transmission method according to an embodiment of this application.

It should be noted that, in the foregoing embodiments, an example in which the Phone Clone APP is installed and run in both the first terminal and the second terminal is used for description. It may be understood that the first terminal and the second terminal may alternatively integrate the data transmission function into setting functions of the first terminal and the second terminal. Taking the first terminal as an example, as shown in (a) in FIG. 9, a setting interface 901 of the first terminal includes an option 902: Data copy. As shown in (b) in FIG. 9, after the user enables the option 902: Data copy, if it is detected that the Wi-Fi connection and the USB connection are established, the first terminal may display at least one piece of candidate data such as Contacts, Messages, Photos, Call logs, Music, and Applications for the user to select. After selecting the to-be-transmitted data that needs to be transmitted from the candidate data, the user may tap a sending button 903 to trigger the first terminal to send the to-be-transmitted data to the second terminal through the Wi-Fi connection and the USB connection based on step S404.

Figure 10A:
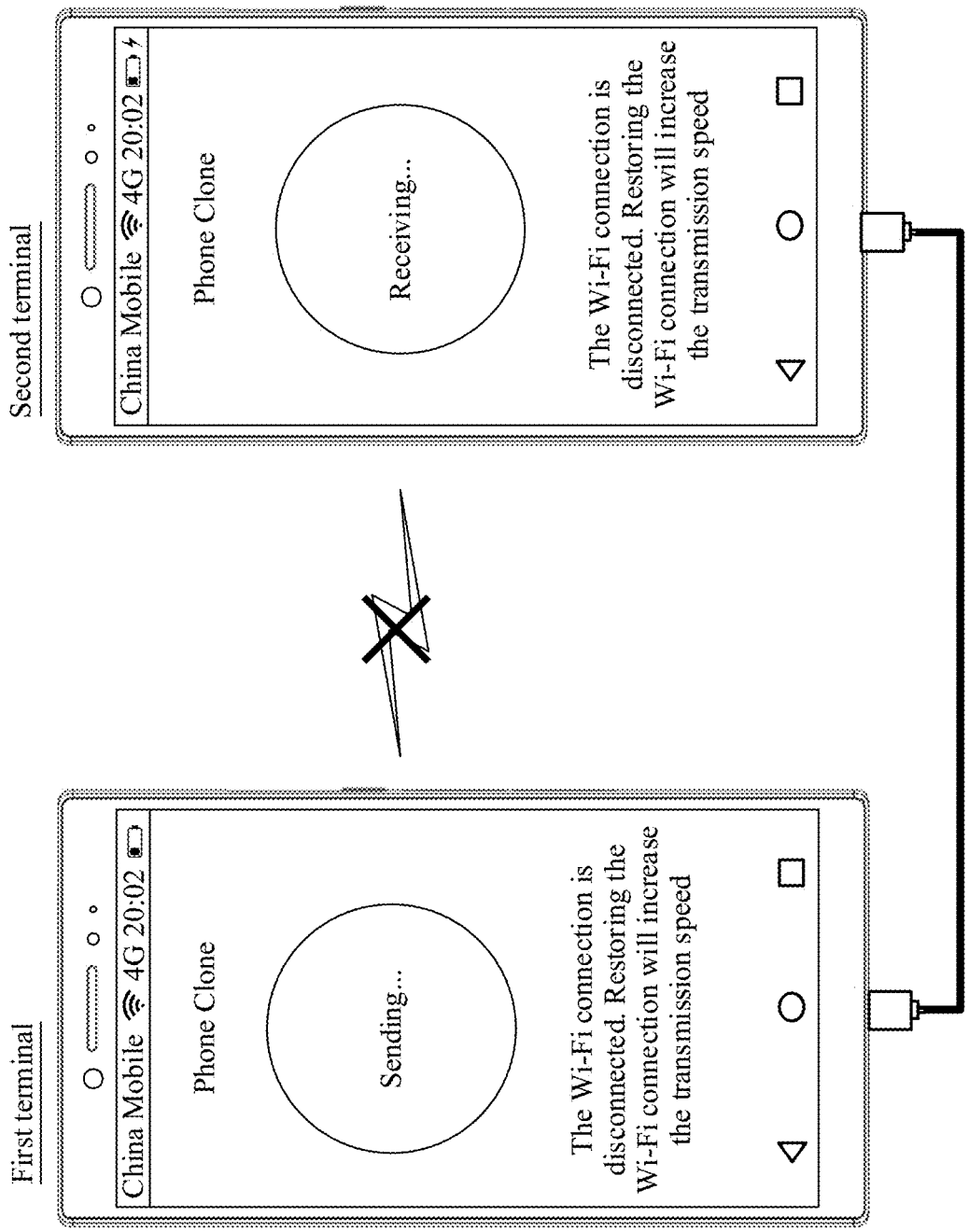
FIG. 10(a) and FIG. 10(b) are a schematic scenario diagram 8 of a data transmission method according to an embodiment of this application.
Figure 10B:
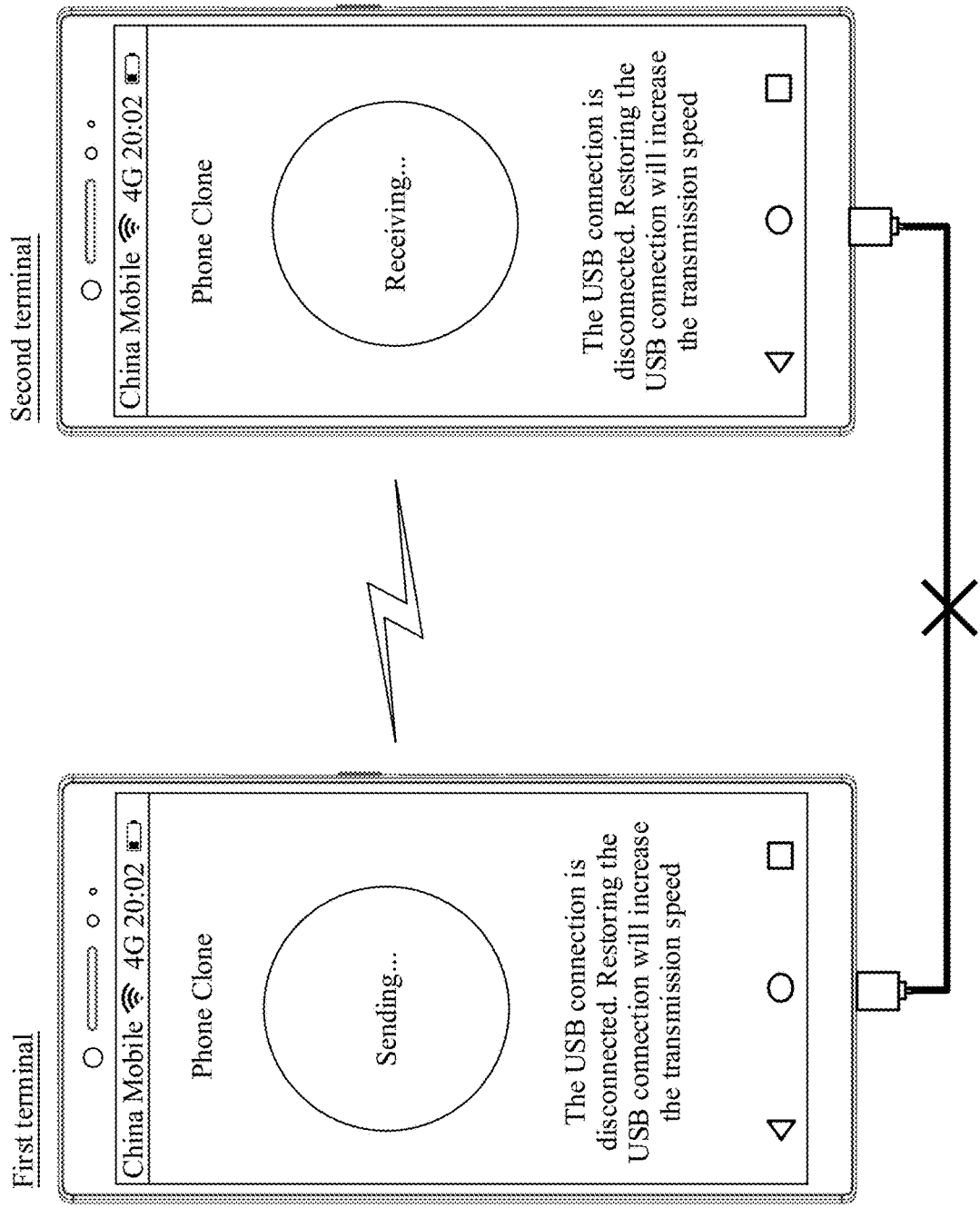

Further, as shown in (a) in FIG. 10, in a process of transmitting data between the first terminal and the second terminal, if it is detected that the Wi-Fi connection is disconnected, a Wi-Fi Manager in the first terminal may report a Wi-Fi connection disconnected event to the Phone Clone APP. In this case, the Phone Clone APP may switch a transmission manner of the first data from transmission through the Wi-Fi connection to transmission through the USB connection. In addition, both the first terminal and the second terminal may inform the user that the Wi-Fi connection is disconnected, or either of the first terminal and the second terminal informs the user that the Wi-Fi connection is disconnected. Correspondingly, as shown in (b) in FIG.

10, in a process of transmitting data between the first terminal and the second terminal, if it is detected that the USB connection is disconnected, the USB Manager in the first terminal may report a Wi-Fi connection disconnected event to the Phone Clone APP. In this case, the Phone Clone APP may switch a transmission manner of the second data from transmission through the USB connection to transmission through the Wi-Fi connection. In addition, both the first terminal and the second terminal may inform the user that the USB connection is disconnected, or either of the first terminal and the second terminal informs the user that the USB connection is disconnected.

Certainly, if the first terminal and the second terminal re-establish a Wi-Fi connection after the Wi-Fi connection is disconnected, or the first terminal and the second terminal re-establish a USB connection after the USB connection is disconnected, the first terminal may resume simultaneously transmitting currently remaining to-be-transmitted data to the second terminal through the two transmission channels: the USB connection and the Wi-Fi connection, to implement dynamic switching between a dual-transmission channel and a single-transmission channel.

It should be noted that the Wi-Fi connection or the USB connection may be disconnected by the user by manually operating the first terminal (or the second terminal). For example, the user disables the Wi-Fi function or the user unplugs the USB data cable between the first terminal and the second terminal. Alternatively, the Wi-Fi connection or the USB connection may be automatically disconnected by the first terminal (or the second terminal). For example, the established Wi-Fi connection may be automatically disconnected when the first terminal or the second terminal detects that quality of the Wi-Fi network is relatively poor or a battery level of a terminal is relatively low. This is not limited in this embodiment of this application.

In addition, in a process of transmitting data between the first terminal and the second terminal, if a battery level difference between the first terminal and the second terminal is greater than a first threshold, and a party with a lower battery level is a USB host device that supplies power, power of the USB host device is likely to be exhausted and data transmission is interrupted if the USB host device continues to supply power to a USB slave device.

Therefore, in this embodiment provided in this application, when a battery level difference between the USB host device and the USB slave device (the first terminal and the second terminal) is greater than the first threshold, and the USB host device is a party with a lower battery level, the first terminal and the second terminal at two ends of the USB data cable may automatically switch a current host-slave relationship of the USB connection. That is, the USB host device with a lower battery level switches to a USB slave device that is supplied with power, and the USB slave device with a higher battery level switches to a USB host device that supplies power. In this way, a party with a lower battery level is charged in time, to avoid a problem that transmission is interrupted because a battery level of one party is excessively low, and improve stability of a data transmission process.

The USB host device that supplies power may be the first terminal or the second terminal. Correspondingly, when the USB host device is the first terminal, the USB slave device that is supplied with power is the second terminal. When the USB host device is the second terminal, the USB slave device that is supplied with power is the first terminal.

For example, when the first terminal establishes the USB connection to the second terminal (step S402), a host-slave relationship between the first terminal and the second terminal is determined. For example, the first terminal is a USB host device, and the second terminal is a USB slave device. The first terminal may obtain a power status of the second terminal (the USB slave device) and a power status of the first terminal. For example, the Phone Clone APP running in the first terminal may periodically obtain the power status of the second terminal and the power status of the first terminal, and calculates a battery level difference between the USB host device and the USB slave device.

Figure 11A:
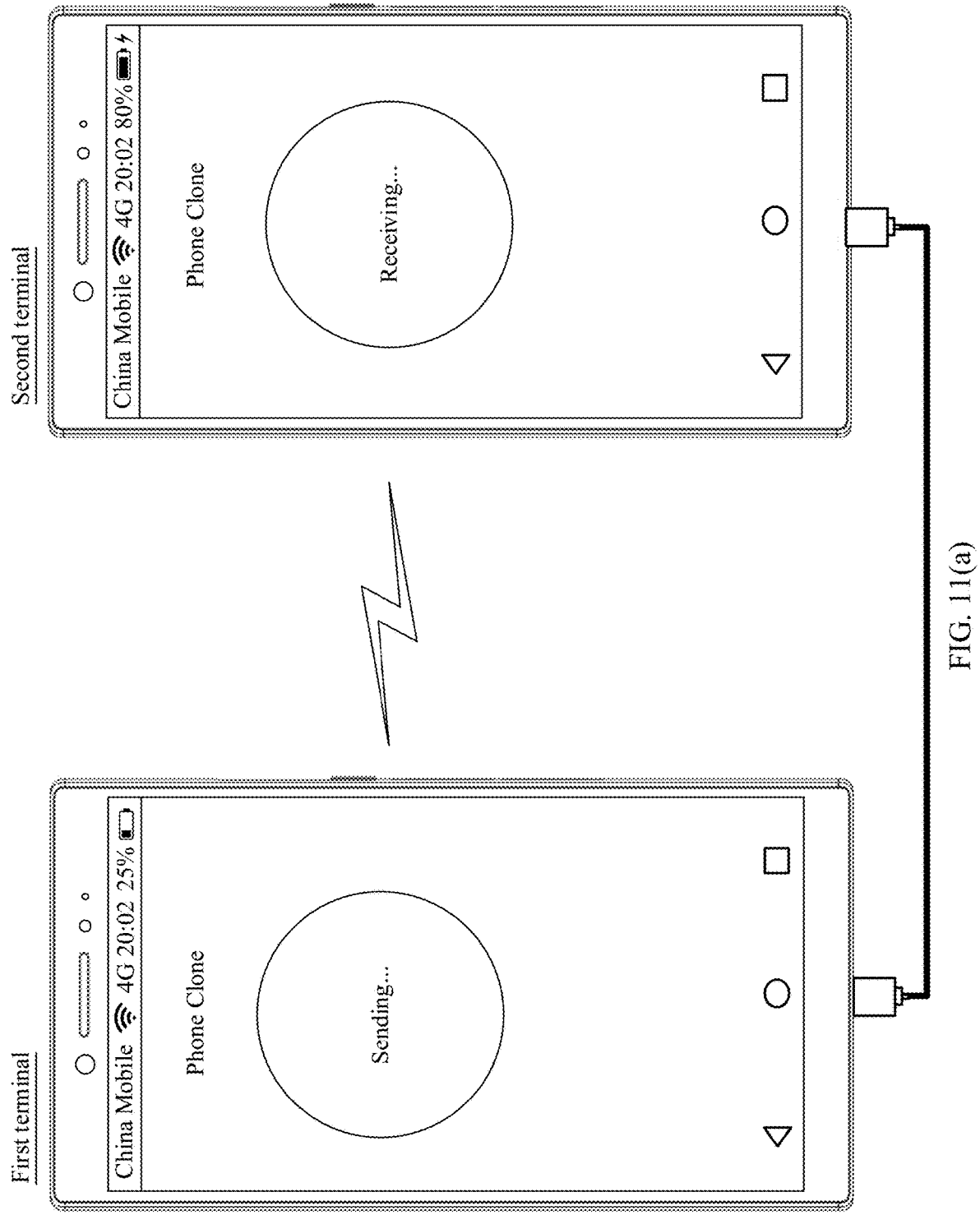
FIG. 11(a) and FIG. 11(b) are a schematic scenario diagram 9 of a data transmission method according to an embodiment of this application.
Figure 11B:
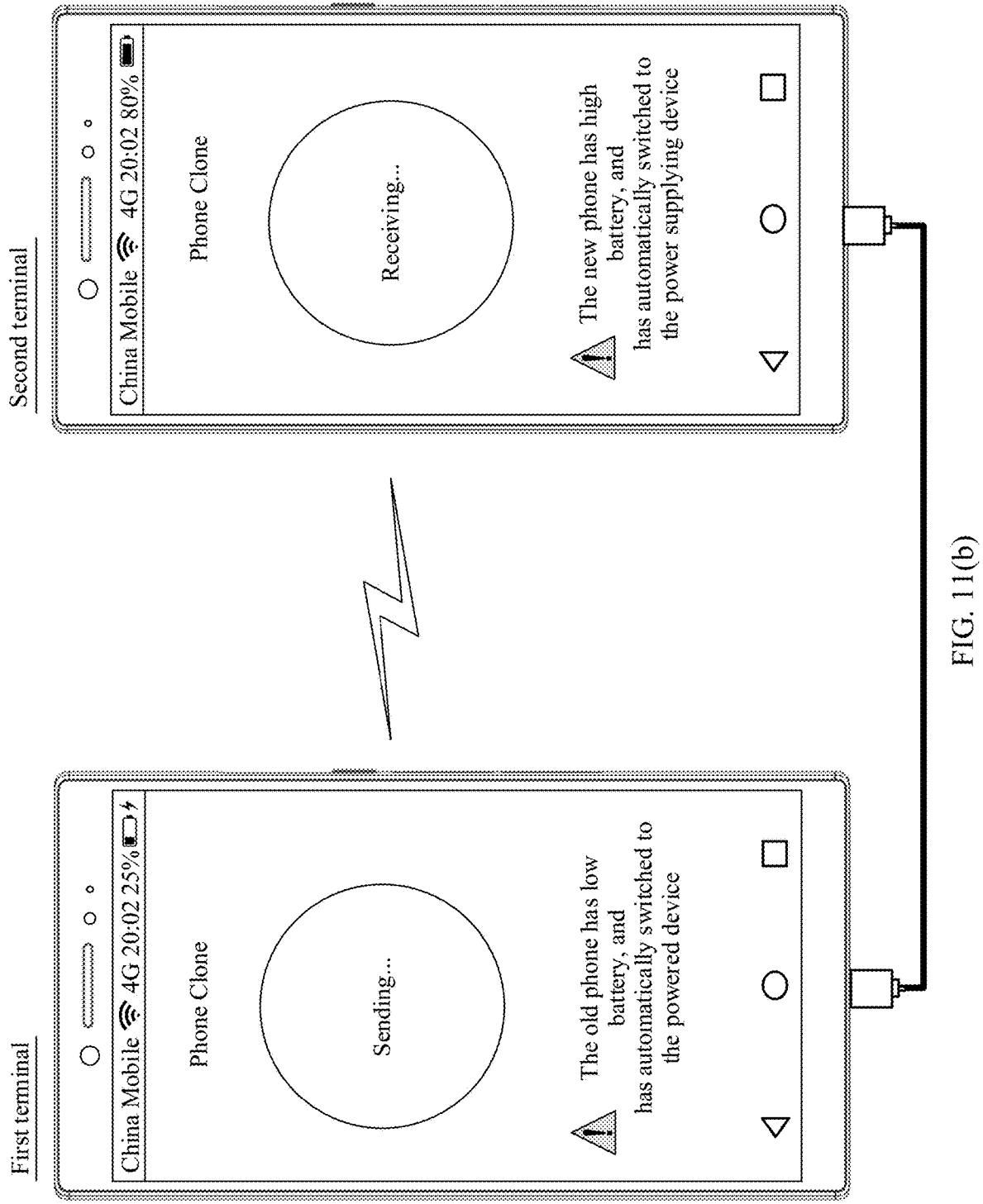

As shown in (a) in FIG. 11, a battery level of the USB host device is 25%, and a battery level of the USB slave device is 80%. In this case, a battery level difference between the USB host device and the USB slave device is greater than the first threshold (for example, 50%). The Phone Clone APP in the USB host device may interact with the Phone Clone APP in the USB slave device, to determine that the two parties are ready to switch the current host-slave relationship. Further, the Phone Clone APP in the USB host device may invoke the USB manager at the application framework layer, to switch the USB manager from a USB-HostManager mode to a USBDeviceManager mode. In this case, as shown in (b) in FIG. 11, the first terminal switches from a USB host device to a USB slave device. In addition, the Phone Clone APP in the USB slave device may also invoke the USB manager at the application framework layer, to switch the USB manager from a USBDeviceManager mode to a USBHostManager mode. In this case, as shown in (b) in FIG. 11, the second terminal switches from a USB slave device to a USB host device, and the second terminal that switches to a USB host device supplies power to the first terminal that switches to a USB slave device.

It should be noted that, after the second terminal switches to a USB host device and the first terminal switches to a USB slave device, although the host-slave relationship between the two ends of the USB data cable switches, a data transmission direction between the first terminal and the second terminal does not change, and the to-be-transmitted data is still sent by the first terminal to the second terminal. In this way, power balance between the devices at the two ends of the USB data cable can be implemented without interfering with data transmission, to avoid a problem that transmission is interrupted because a batter level of one party is excessively low during data transmission.

In some embodiments of this application, the USB data cable between the first terminal and the second terminal may be a C-to-C direct-connection data cable. Because the C-to-C direct-connection data cable supports a negotiation mechanism specified by the host negotiation protocol (HNP), when the battery level difference between the USB host device and the USB slave device is greater than the first threshold, and the USB host device is a party with a lower battery level, the USB host device and the USB slave device may perform negotiation based on HNP to determine a negotiation result such as a switching occasion of the USB host device and the USB slave device and switched roles, and then dynamically switch a host-slave relationship between the USB host device and the USB slave device based on the negotiation result.

In some other embodiments of this application, the USB data cable between the first terminal and the second terminal may be alternatively a non-C-to-C direct-connection data cable. For example, the USB data cable between the first terminal and the second terminal may be a USB data cable converted by an OTG connector. Because the non-C-to-C direct-connection data cable probably cannot support the mechanism in the host negotiation protocol, when the battery level difference between the USB host device and the USB slave device is greater than the first threshold, and the USB host device is a party with a lower battery level, the USB host device may send a switching instruction to the USB slave device, and automatically power off the USB data cable connected to the USB host device after receiving a response from the USB slave device, to forcibly switch the originally running USB host device mode to a USB slave device mode. After receiving the switching instruction sent by the USB host device, the original USB slave device may also automatically power off the USB data cable connected to the USB slave device, to forcibly switch the original running USB slave device mode to a USB host device mode. After the switched USB host device and the switched USB slave device re-power on the USB data cable, the USB connection between the first terminal and the second terminal may be resumed, thereby implementing host-slave relationship switching between the devices at the two ends of the USB data cable.

In addition, in a process of performing host-slave relationship switching between the USB host device and the USB slave device, the USB connection may be suspended for data transmission, to avoid a phenomenon that an error occurs in data transmission due to host-slave relationship switching.

It should be noted that, in the foregoing embodiments, the USB host device is used as an execution body to describe processes of obtaining the battery level difference between the USB host device and the USB slave device, switching the host-slave relationship between the USB host device and the USB slave device based on the battery level difference, and instructing the USB slave device to perform host-slave relationship switching. It may be understood that the USB slave device may be alternatively used as an execution body to obtain the battery level difference between the USB host device and the USB slave device, switch the host-slave relationship between the USB host device and the USB slave device based on the battery level difference, and instruct the USB host device to perform host-slave relationship switching. This is not limited in this embodiment of this application.

In addition, after the first terminal establishes the wireless connection (for example, the Wi-Fi connection) to the second terminal, there may also be a host-slave relationship between devices at two ends of the Wi-Fi connection. For example, if the first terminal enables a personal hotspot, the second terminal may use the first terminal as a Wi-Fi access point to access the personal hotspot of the first terminal. In this case, the first terminal may serve as a Wi-Fi host device, and the second terminal may serve as a Wi-Fi slave device. For another example, if the Wi-Fi connection is established between the first terminal and the second terminal through a Wi-Fi direct connection, when the Wi-Fi connection is being established, a terminal (for example, the first terminal) may be determined as a group owner (the Wi-Fi host device) based on a related protocol specification of the Wi-Fi direct connection, for example, the 802.11z protocol, and the second terminal may serve as a group client (the Wi-Fi slave device) to connect to the group owner, to establish the Wi-Fi connection between the first terminal and the second terminal.

Generally, the Wi-Fi host device consumes more power than the Wi-Fi slave device in the data transmission process. Therefore, to avoid a problem that transmission is interrupted because power consumption of the Wi-Fi host device is excessively high in the data transmission process, when a battery level difference between the Wi-Fi host device and the Wi-Fi slave device is greater than a second threshold (the second threshold may be the same as or different from the first threshold), and the Wi-Fi host device is a party with a lower battery level, the first terminal and the second terminal may automatically switch a current host-slave relationship of the Wi-Fi connection. That is, the current Wi-Fi host device with a lower battery level switches to a Wi-Fi slave device with lower power consumption, and the Wi-Fi slave device with a higher battery level switches to a Wi-Fi host device with higher power consumption, to alleviate a problem that transmission is interrupted because power consumption of the Wi-Fi host device is excessively high.

Certainly, if the Wi-Fi slave device consumes more power in the data transmission process, when the battery level difference between the Wi-Fi host device and the Wi-Fi slave device may be greater than the second threshold (the second threshold is the same as or different from the first threshold), and the Wi-Fi slave device is a party with a lower battery level, the first terminal and the second terminal automatically switch the host-slave relationship of the current Wi-Fi connection, to alleviate a problem that transmission is interrupted because power consumption of the Wi-Fi slave device is excessively high. The first terminal may perform host-slave relationship switching of the Wi-Fi connection, and certainly, the second terminal may alternatively perform host-slave relationship switching of the Wi-Fi connection.

In other words, in this embodiment of this application, based on power statuses of the first terminal and the second terminal, a party with a higher battery level may be controlled to play a role that consumes more power in the transmission process, thereby reducing a probability that transmission is interrupted because power of one party is exhausted in the data transmission process.

Figure 12A:
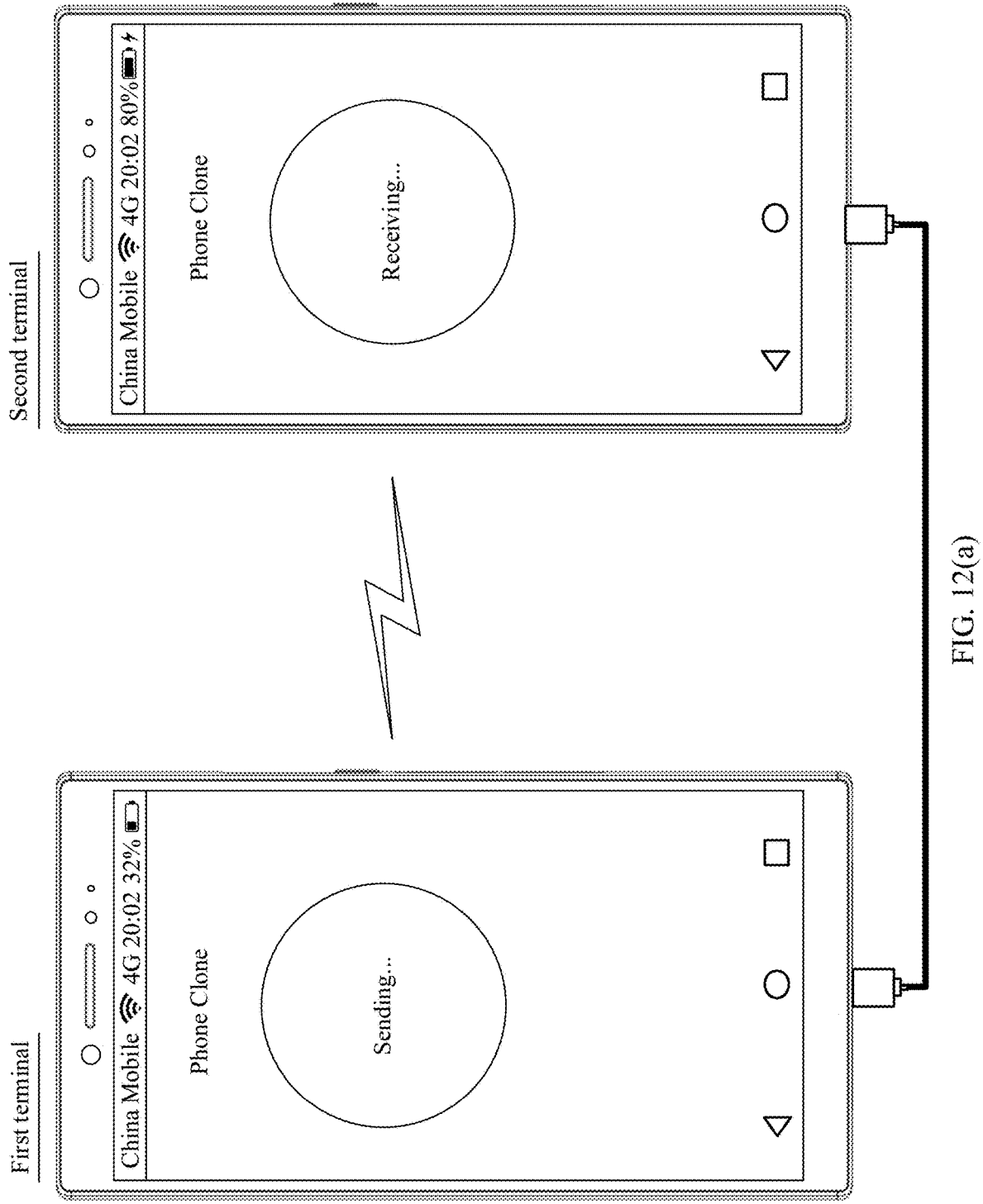
FIG. 12(a) and FIG. 12(b) are a schematic scenario diagram 10 of a data transmission method according to an embodiment of this application.
Figure 12B:
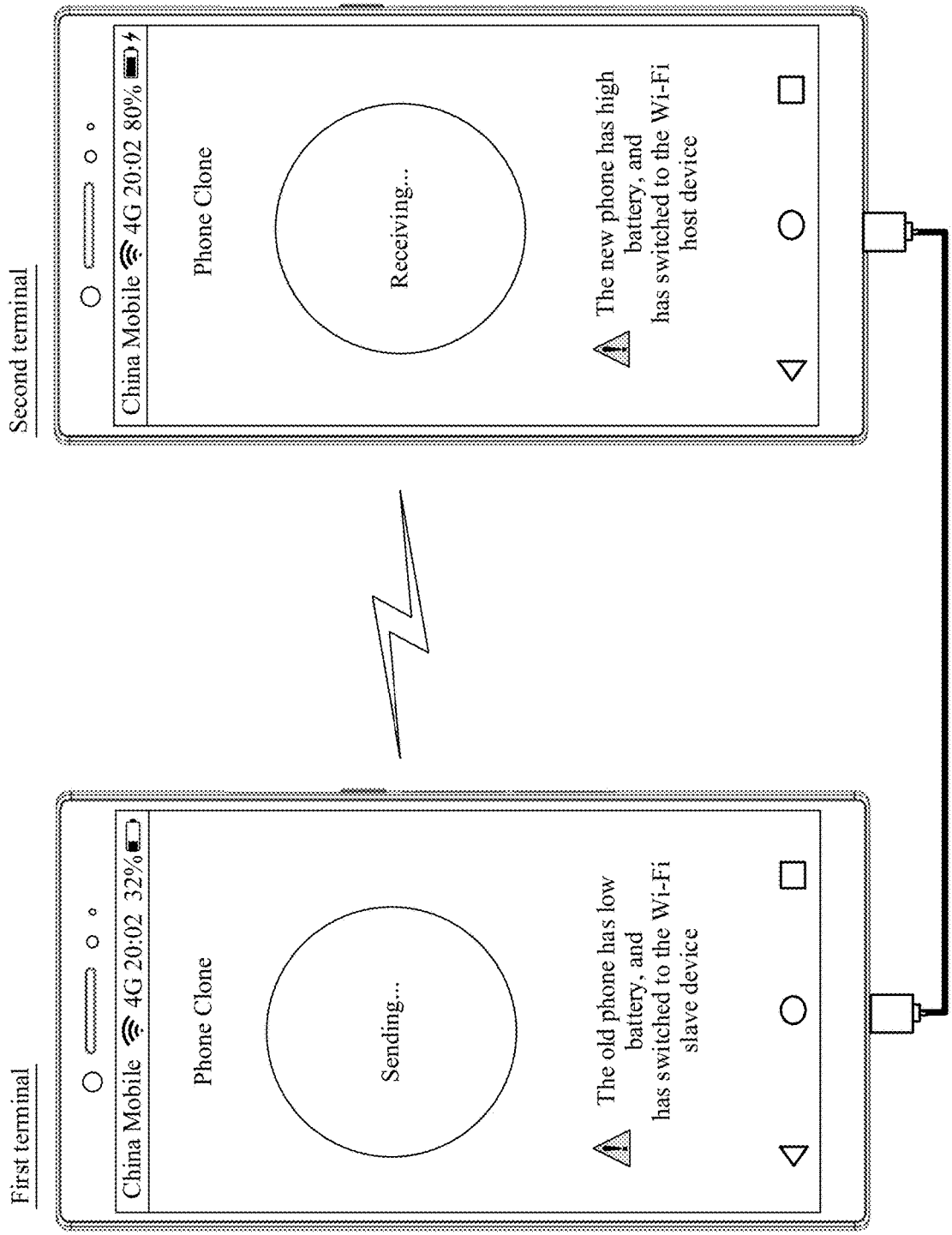

Similar to switching the host-slave relationship of the USB connection in the foregoing embodiment, as shown in (a) in FIG. 12, a battery level of the Wi-Fi host device is 32%, and a battery level of the Wi-Fi slave device is 80%. In this case, the battery level difference between the Wi-Fi host device and the Wi-Fi slave device is greater than the second threshold (for example, 40%). The Phone Clone APP in the Wi-Fi host device may interact with the Phone Clone APP in the Wi-Fi slave device, to determine that the two parties are to switch the host-slave relationship of the current Wi-Fi connection.

Further, the Phone Clone APP in the Wi-Fi host device may invoke the Wi-Fi manager at the application framework layer, to switch the Wi-Fi manager from a current running mode to a Wi-Fi slave device mode. In this case, as shown in (b) in FIG. 12, the first terminal switches from a Wi-Fi host device to a Wi-Fi slave device. In addition, the Phone Clone APP in the Wi-Fi slave device may also invoke the Wi-Fi manager at the application framework layer, to switch the Wi-Fi manager from a current running mode to a Wi-Fi host device mode. In this case, as shown in (b) in FIG. 12, the second terminal switches from a Wi-Fi slave device to a Wi-Fi host device.

In this way, after the original Wi-Fi host device with a lower battery level switches to a Wi-Fi slave device, and power consumption of the Wi-Fi host device may be correspondingly reduced, thereby reducing a probability that transmission is interrupted because power of one party is exhausted in the data transmission process.

It should be noted that in the foregoing embodiments, an example in which the first terminal serves as a Wi-Fi host device to switch to a Wi-Fi slave device is used for description. It may be understood that, alternatively, the second terminal may serve as a Wi-Fi host device to switch to a Wi-Fi slave device. This is not limited in this embodiment of this application.

Figure 13:
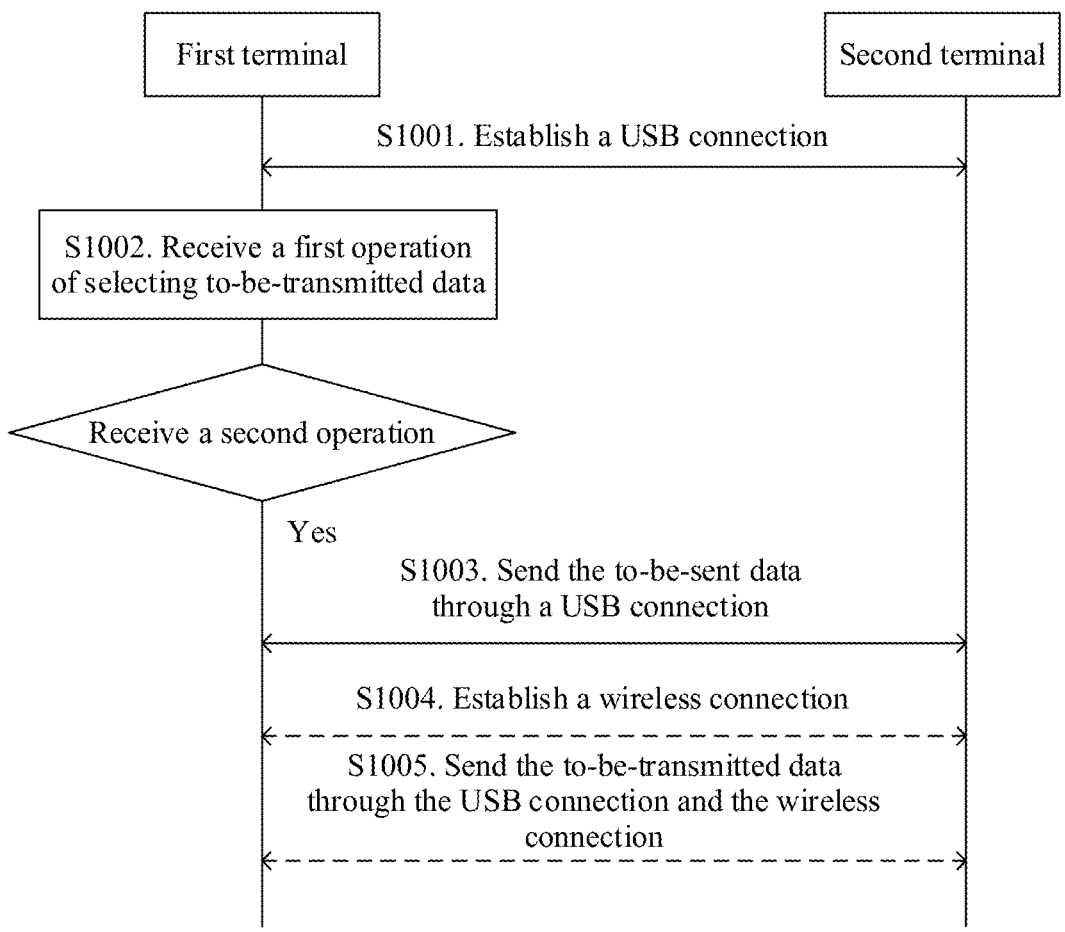
FIG. 13 is a schematic interaction diagram 2 of a data transmission method according to an embodiment of this application.

FIG. 13 is a schematic flowchart of a data transmission method according to some other embodiments of this application. As shown in FIG. 13, the data transmission method may include the following steps.

S1001. A first terminal establishes a USB connection to a second terminal.

For a specific method of establishing the USB connection to the second terminal by the first terminal, refer to the related descriptions of step S402. Details are not described herein again. It may be understood that, before S1001, a Phone Clone APP in the first terminal may be opened, and a Phone Clone APP in the second terminal may be opened.

S1002. The first terminal receives first input of selecting to-be-transmitted data by a user from the first terminal.

Different from step S403, after detecting that the USB connection is established, the first terminal may report, to the Phone Clone APP running in the first terminal, a message indicating that the USB connection is established, and the Phone Clone APP may be triggered to jump to the interface 701 shown in FIG. 7A or FIG. 7B without determining that a Wi-Fi connection is established. Further, the first terminal may receive the first input of selecting the to-be-transmitted data by the user on the interface 701. Certainly, a setting interface 901 of the first terminal may include an option: Data copy 902. As shown in (b) in FIG. 9, after the user enables the option: Data copy 902, the first terminal may display at least one piece of candidate data such as Contacts, Messages, Photos, Call logs, Music, and Applications for the user to select. Selecting the to-be-transmitted data by the user from the candidate data may be the first input.

S1003. The first terminal sends the to-be-transmitted data to the second terminal through the USB connection in response to second input performed by the user on the first terminal.

In step S1003, if it is detected that the user performs, on the first terminal, the second input of sending the to-be-transmitted data, for example, the user taps a sending button 702 on the interface 701, because only a transmission channel: the USB connection is currently available between the first terminal and the second terminal, the first terminal may send the to-be-transmitted data selected by the user to the second terminal through the USB connection. Because stability of the USB connection and a data transmission speed are relatively high, a speed and stability of sending the to-be-transmitted data to the second terminal through the USB connection are higher than those of sending the to-be-transmitted data to the second terminal through the Wi-Fi connection.

S1004 (optional). The first terminal establishes a wireless connection to the second terminal. For example, the first terminal establishes a Wi-Fi connection to the second terminal.

S1005 (optional). The first terminal sends the to-be-transmitted data to the second terminal through the USB connection and the wireless connection.

For example, the Wi-Fi connection is used as the wireless connection. In a process of performing steps S1001 to S1003, the first terminal may detect whether the Wi-Fi connection to the second terminal is established, or the second terminal may detect whether the Wi-Fi connection to the first terminal is established.

Before step S1003 is performed, that is, before the first terminal sends the to-be-transmitted data through the USB connection, if it is detected that the first terminal establishes the wireless connection to the second terminal, step S404 is performed, and the first terminal may serve as a transmit end to transmit one part (first data) of the to-be-transmitted data to the second terminal through the established Wi-Fi connection. In addition, the first terminal may further transmit the other part (second data) of the to-be-transmitted data to the second terminal through the established USB connection. In this way, the first terminal may simultaneously transmit data to the second terminal through two transmission channels: the USB connection and the Wi-Fi connection, thereby greatly increasing a speed of data transmission between terminals.

Figure 14:
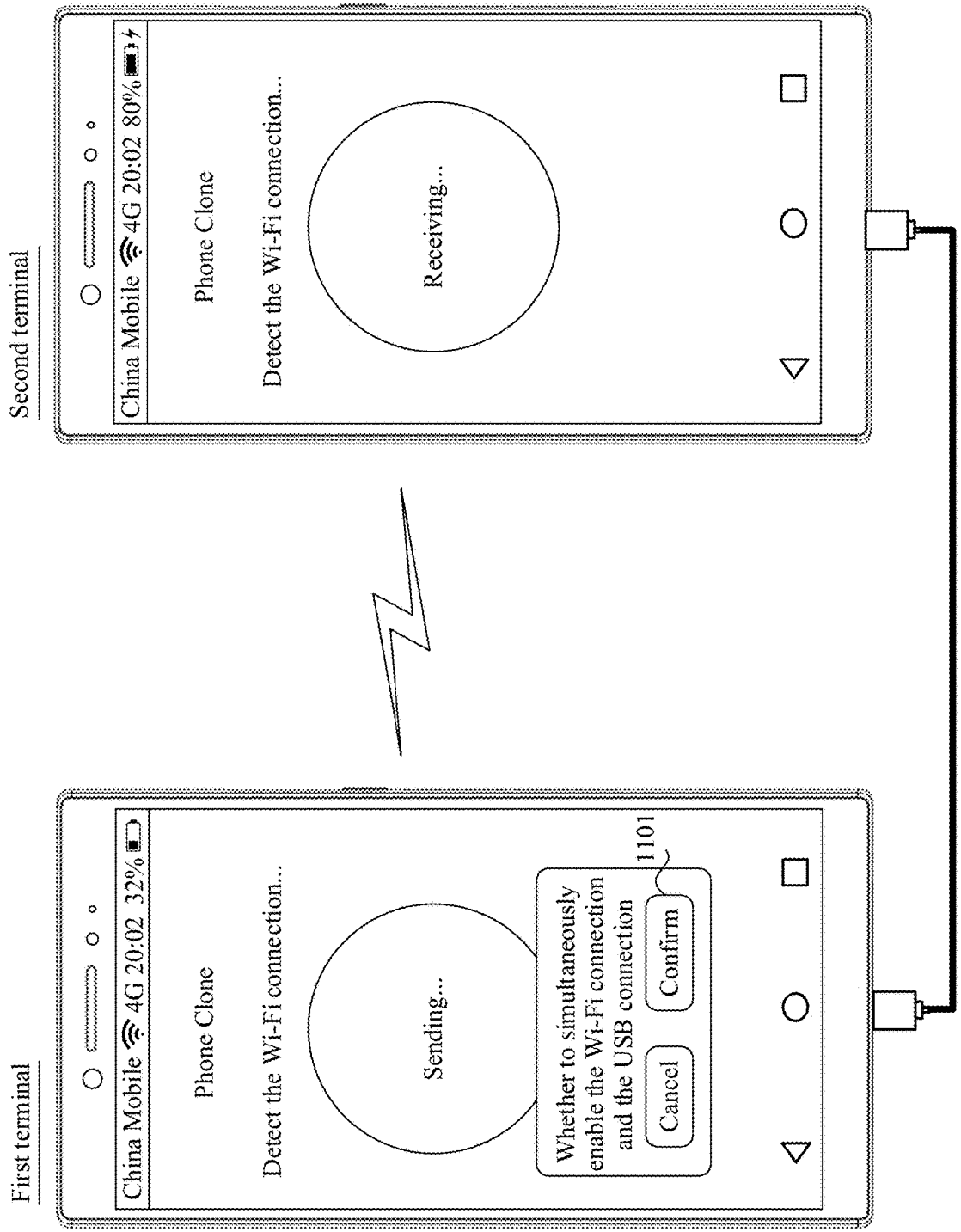
FIG. 14 is a schematic scenario diagram 11 of a data transmission method according to an embodiment of this application.

Correspondingly, in a process of performing step S1003, that is, in a process in which the first terminal sends the to-be-transmitted data through the USB connection, it is detected that the first terminal establishes the wireless connection to the second terminal. In this case, as shown in FIG. 14, the first terminal (or the second terminal) may prompt the user whether to simultaneously enable the Wi-Fi connection and the USB connection for transmission. If it is detected that the user taps a determining button 1101, the first terminal may divide currently remaining to-be-transmitted data into two parts, continuously send one part to the second terminal through the USB connection, and send the other part to the second terminal through the newly established Wi-Fi connection. In this way, dynamic switching between a dual-transmission channel and a single-transmission channel in a data transmission process is implemented.

Optionally, when it is detected that the user taps the determining button 1101, the first terminal may alternatively send the currently remaining to-be-transmitted data to the second terminal through the wireless connection, for example, the Wi-Fi connection. The first terminal may transmit the to-be-transmitted data to the second terminal without the USB connection.

Certainly, in the process in which the first terminal sends the to-be-transmitted data through the USB connection, if it is detected that the first terminal establishes the wireless connection to the second terminal, the first terminal may send, to the second terminal through a dual-transmission channel by default without the user's perception, the to-be-transmitted data that is not sent. This is not limited in this embodiment of this application.

In addition, in the process in which the first terminal sends the to-be-transmitted data to the second terminal, when a battery level difference between a USB host device and a USB slave device is greater than a first threshold, and the USB host device is a party with a lower battery level, the first terminal and the second terminal at two ends of a USB data cable may switch a current host-slave relationship of the USB connection. In this way, a party with a lower battery level is charged in time, to avoid a problem that transmission is interrupted because a battery level of one party is excessively low, and improve stability of a data transmission process.

Similarly, in the process in which the first terminal sends the to-be-transmitted data to the second terminal, when a battery level difference between a Wi-Fi host device and a Wi-Fi slave device is greater than a second threshold, and the Wi-Fi host device is a party with a lower battery level, the first terminal and the second terminal may also switch a current host-slave relationship of the Wi-Fi connection, to alleviate a problem that transmission is interrupted because power consumption of the Wi-Fi host device is excessively high.

For a specific method for switching the current host-slave relationship of the USB connection and switching the current host-slave relationship of the Wi-Fi connection, refer to the related descriptions of step S404. Details are not described herein again.

It should be noted that, in the foregoing embodiment, the first threshold and the second threshold that are used to determine whether a battery level difference between the first terminal and the second terminal meets a host-slave relationship switching condition may be set by a person skilled in the art according to actual experience or an actual application scenario, or may be dynamically adjusted by the first terminal or the second terminal in the data transmission process based on a specific algorithm. This is not limited in this embodiment of this application.

For example, a value of the first threshold is set. A sum of a battery level of the first terminal and a battery level the second terminal is definite. Therefore, to ensure that current data transmission can be completed, the first terminal (or the second terminal) may estimate a battery level required for completing the current data transmission based on a data amount of the to-be-transmitted data and current transmission speeds of the USB connection and the Wi-Fi connection. In this way, based on the estimated battery level, the first terminal (or the second terminal) may dynamically set the value of the first threshold, to ensure that both the battery level of the first terminal and the battery level of the second terminal are not zero after the current data transmission is completed.

In addition, the user uses the Phone Clone APP to copy data in order to use a new mobile phone as soon as possible, and a battery level of the new mobile phone is usually relatively low. Therefore, the value of the first threshold may be further appropriately reduced, so that the first terminal as an old mobile phone can supply power to the new mobile phone (the second terminal) as soon as possible, to ensure that the battery level of the second terminal is greater than the battery level of the first terminal after the current data transmission is completed.

In this case, steps S1001 to S1005 describe a data transmission scenario in which the first terminal first establishes the wireless connection to the second terminal, and when data is transmitted based on the wireless connection, if the first terminal establishes the USB connection to the second terminal, the first terminal simultaneously transmits data to the second terminal through the two transmission channels: the USB connection and the Wi-Fi connection.

Figure 15:
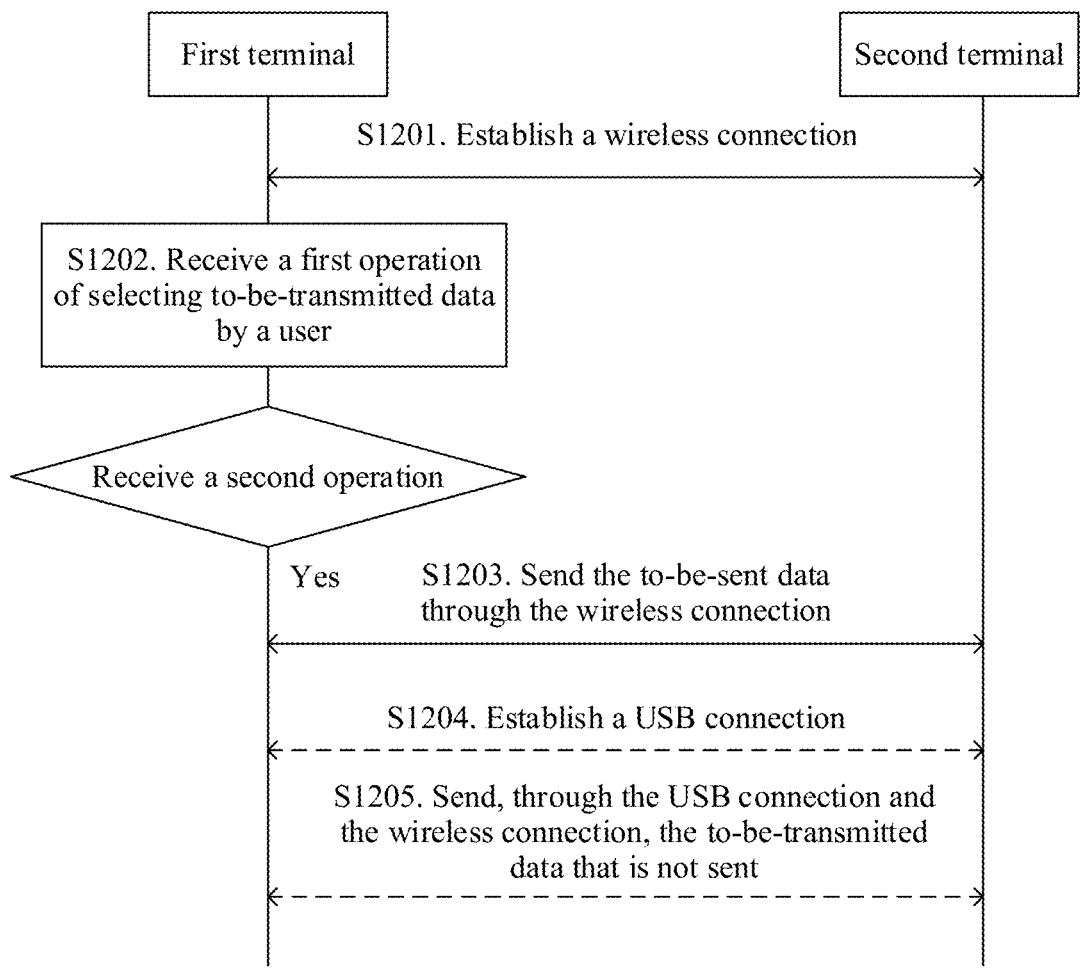
FIG. 15 is a schematic interaction diagram 3 of a data transmission method according to an embodiment of this application.

Correspondingly, in some other embodiments of this application, the first terminal may alternatively first establish the USB connection to the second terminal, and when data is transmitted based on the USB connection, if the first terminal establishes the wireless connection to the second terminal, the first terminal may still simultaneously transmit data to the second terminal through the two transmission channels: the USB connection and the Wi-Fi connection. In this case, as shown in FIG. 15, the data transmission method may include the following steps.

S1201. A first terminal establishes a wireless connection to a second terminal. For example, the first terminal establishes a Wi-Fi connection to the second terminal.

It may be understood that, before the first terminal establishes the wireless connection to the second terminal, a Phone Clone APP in the first terminal may be opened, and a Phone Clone APP in the second terminal may be opened.

S1202. The first terminal receives first input of selecting to-be-transmitted data by a user from the first terminal.

S1203. The first terminal sends the to-be-transmitted data to the second terminal through the wireless connection in response to second input performed by the user on the first terminal.

Corresponding to steps S1001 to S1003, in steps S1201 to S1203, if the user enables Wi-Fi functions of the first terminal and the second terminal and operates the two terminals to establish the wireless connection between the first terminal and the second terminal, the first terminal as a data transmit end may jump to an interface 701 of the Phone Clone APP, and receive the first input of selecting the to-be-transmitted data by the user on the interface 701. Further, if it is detected that the user taps a sending button 702 on the interface 701 (which is the second input), because only a transmission channel: the Wi-Fi connection is currently available between the first terminal and the second terminal, the first terminal may send the to-be-transmitted data selected by the user to the second terminal through the Wi-Fi connection.

S1204 (optional). The first terminal establishes a USB connection to the second terminal.

S1205 (optional). The first terminal sends, to the second terminal through the USB connection and the wireless connection, the to-be-transmitted data that is not sent.

Corresponding to steps S1004 and S1005, before the first terminal sends the to-be-transmitted data through the Wi-Fi connection, if it is detected that the first terminal establishes the USB connection to the second terminal, step S404 may be performed, and the first terminal serves as a transmit end to transmit one part (first data) of the to-be-transmitted data to the second terminal through the Wi-Fi connection. In addition, the first terminal may further transmit the other part (second data) of the to-be-transmitted data to the second terminal through the USB connection. In this way, the first terminal may simultaneously transmit data to the second terminal through two transmission channels: the USB connection and the Wi-Fi connection, thereby greatly increasing a speed of data transmission between terminals.

Figure 16:
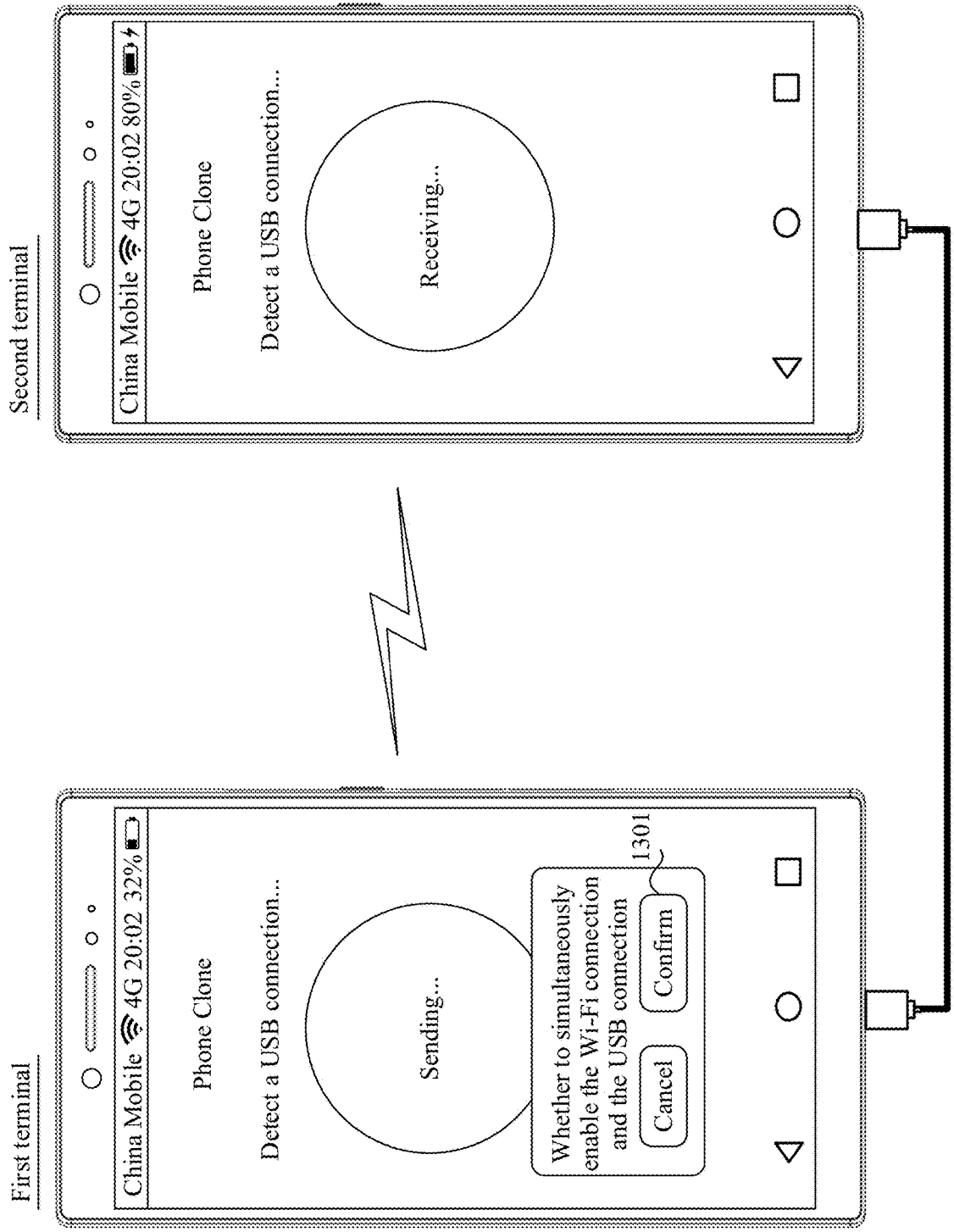
FIG. 16 is a schematic scenario diagram 12 of a data transmission method according to an embodiment of this application.

Correspondingly, in a process in which the first terminal sends the to-be-transmitted data by using the Wi-Fi connection, it is detected that the first terminal establishes a USB connection to the second terminal. In this case, as shown in FIG. 16, the first terminal (or the second terminal) may prompt the user whether to simultaneously enable the USB connection and the wireless connection for data transmission. If it is detected that the user taps a determining button 1301, the first terminal may divide currently remaining to-be-transmitted data into two parts, continuously send one part to the second terminal through the USB connection, and send the other part to the second terminal through the newly established Wi-Fi connection. In this way, dynamic switching between a dual-transmission channel and a single-transmission channel in a data transmission process is implemented.

Optionally, when the first terminal establishes the USB connection to the second terminal, and detects that the user taps the determining button 1301, the first terminal may send currently remaining to-be-transmitted data to the second terminal through the USB connection. The first terminal may transmit the to-be-transmitted data to the second terminal without the Wi-Fi connection.

Certainly, in a process in which the first terminal sends the to-be-transmitted data to the second terminal, the master-slave relationship of the current USB connection or the master-slave relationship of the current Wi-Fi connection may also be switched based on the related description of step S404. This is not limited in this embodiment of this application.

Figure 17:
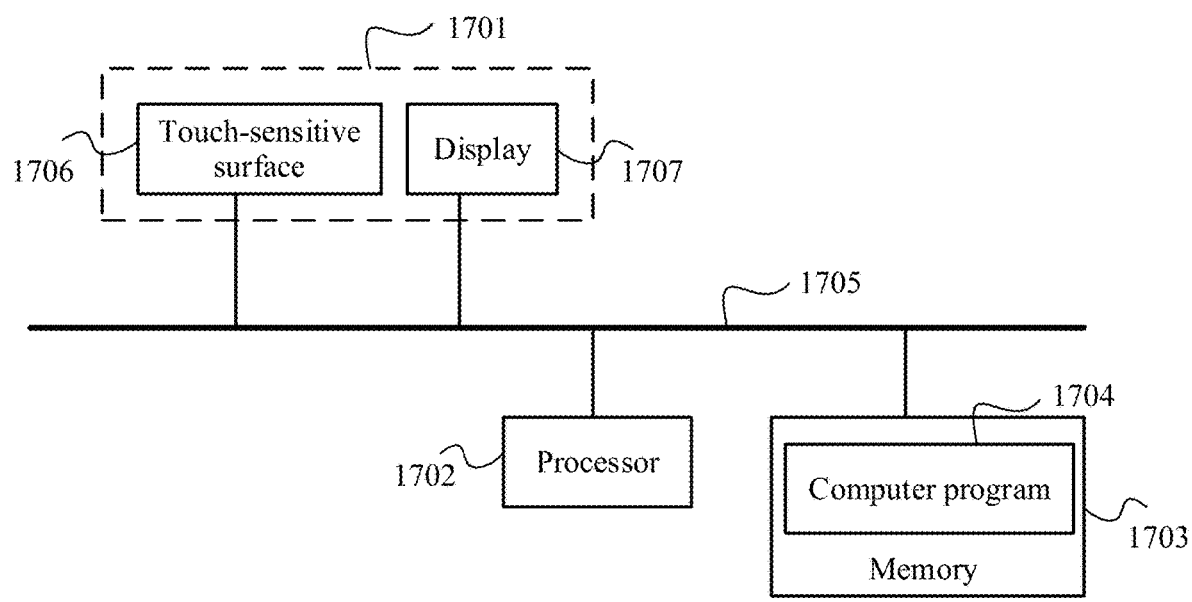
FIG. 17 is a schematic structural diagram 2 of a terminal according to an embodiment of this application.

As shown in FIG. 17, some other embodiments of this application disclose a terminal. The terminal may include a touchscreen 1701. The touchscreen 1701 may include a touch-sensitive surface 1706 and a display screen 1707, one or more processors 1702, and a memory 1703 which may store one or more computer programs 1704. The processor 1702 is connected to the touchscreen 1701 and the memory 1703. For example, the processor 1702 is connected to the touchscreen 1701 and the memory 1703 by using a bus. The one or more processors 1702 may run the computer program 1704 stored in the memory 1703, and the computer program 1704 may be configured to perform related method steps in FIG. 4, FIG. 13, or FIG. 15 to implement the data transmission method in the foregoing embodiments.

An embodiment of this application further provides a computer storage medium. The computer storage medium stores a computer program. When the foregoing processor executes the computer program, the terminal performs related method steps in FIG. 4, FIG. 13, or FIG. 15 to implement the data transmission method in the foregoing embodiments.

An embodiment of this application further provides a computer program product. When the computer program product is run on a computer, the computer is enabled to perform related method steps in FIG. 4, FIG. 13, or FIG. 15 to implement the data transmission method in the foregoing embodiments.

The terminal, the computer storage medium, or the computer program product provided in the embodiments of this application are all configured to perform the corresponding methods provided above. Therefore, for beneficial effects that can be achieved by the terminal, the computer storage medium, or the computer program product, refer to the beneficial effects in the corresponding methods provided above. Details are not described herein again.

It may be understood that the embodiments of the present invention are described based on the accompanying drawings in this specification. Each of the accompanying drawings in the specification may be understood as an embodiment.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a terminal, or the like) to perform all or some of the steps of the methods described in the embodiments of this application. The foregoing storage medium includes: any medium that can store program code, such as a flash memory, a removable hard disk, a read-only memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A data transmission method, applied to a terminal, and comprising:
   establishing, by the terminal, a wireless connection to another terminal;
   establishing, by the terminal, a universal serial bus (USB) connection to the another terminal;
   displaying, by the terminal, a first interface, wherein the first interface comprises at least one piece of candidate data;
   selecting to-be-transmitted data from the at least one piece of candidate data in response to a first input of a user on the first interface; and
   sending, by the terminal, the to-be-transmitted data to the another terminal through the wireless connection and the USB connection in response to a second input of the user on the first interface.

2. The method according to claim 1, wherein the to-be-transmitted data comprises first data and second data; and
   before the sending, by the terminal, the to-be-transmitted data to the another terminal through the wireless connection and the USB connection, the method further comprises at least one of:
   determining, by the terminal, a size of the first data and a size of the second data based on a battery level of the terminal and a battery level of the another terminal;
   determining, by the terminal, a size of the first data and a size of the second data based on network quality of the wireless connection; or
   determining, by the terminal, a size of the first data and a size of the second data based on a transmission speed of the USB connection.

3. The method according to claim 1, wherein the wireless connection is disconnected, the method further comprises:
   sending, by the terminal, untransmitted data to the another terminal through the USB connection.

4. The method according to claim 1, wherein the USB connection is disconnected, the method further comprises:
   sending, by the terminal, untransmitted data to the another terminal through the wireless connection.

5. The method according to claim 1, wherein after the establishing, by the terminal, a USB connection to the another terminal, the method further comprises:
   supplying, by the terminal, power to the another terminal through the USB connection.

6. The method according to claim 5, wherein after the supplying, by the terminal, power to the another terminal through the USB connection, the method further comprises:
   obtaining a remaining battery level of the terminal and a remaining battery level of the another terminal; and
   switching a host-slave relationship of the USB connection based on the remaining battery level of the terminal and the remaining battery level of the another terminal.

7. The method according to claim 6, wherein the switching the host-slave relationship of the USB connection based on the remaining battery level of the terminal and the remaining battery level of the another terminal comprises:
   when a difference between the remaining battery level of the terminal and the remaining battery level of the another terminal is greater than a first threshold, and the terminal is a party with a lower remaining battery level, switching the host-slave relationship of the USB connection.

8. The method according to claim 1, wherein the first input and the second input are two independent gestures; or the first input and the second input are two phases of one gesture.

9. The method according to claim 1, wherein both the terminal and the another terminal support a USB Type-C interface.

10. The method according to claim 1, wherein the candidate data comprises at least one of Contacts, Messages, Photos, Call logs, Audio, Videos, Documents, or Applications.

11. The method according to claim 1, wherein a data transmission application is installed on the terminal, and the first interface is an interface of the data transmission application.

12. The method according to claim 11, wherein before the displaying, by the terminal, a first interface, the method further comprises:
displaying, by the terminal, a second interface of the data transmission application in response to an operation of opening the data transmission application by the user, wherein the second interface is used to prompt the user to set the terminal as a data transmit end or a data receive end.

13. A terminal, comprising a touchscreen and a processor, wherein
the processor is configured to: control the terminal to establish a wireless connection to another terminal; control the terminal to establish a universal serial bus (USB) connection to the another terminal; control the touchscreen to display a first interface, wherein the first interface comprises at least one piece of candidate data; select to-be-transmitted data from the at least one piece of candidate data in response to a first input of a user on the first interface; and control the terminal to send the to-be-transmitted data to the another terminal through the wireless connection and the USB connection in response to a second input of the user on the first interface.

14. The terminal according to claim 13, wherein the to-be-transmitted data comprises first data and second data; and
the processor is further configured to perform at least one of: determining a size of the first data and a size of the second data based on a battery level of the terminal and a battery level of the another terminal; determining a size of the first data and a size of the second data based on network quality of the wireless connection; or determining a size of the first data and a size of the second data based on a transmission speed of the USB connection.

15. The terminal according to claim 13, wherein
the processor is further configured to control the terminal to supply power to the another terminal through the USB connection.

16. The terminal according to claim 15, wherein
the processor is further configured to: obtain a remaining battery level of the terminal and a remaining battery level of the another terminal, and control the terminal to switch a host-slave relationship of the USB connection based on the remaining battery level of the terminal and the remaining battery level of the another terminal.

17. The terminal according to claim 15, wherein
the processor is specifically configured to: when a difference between the remaining battery level of the terminal and the remaining battery level of the another terminal is greater than a first threshold, and the terminal is a party with a lower remaining battery level, switch a host-slave relationship of the USB connection.

18. The terminal according to claim 13, wherein a data transmission application is installed on the terminal, and the first interface is an interface of the data transmission application; and
the processor is further configured to control the touchscreen to display a second interface of the data transmission application in response to an operation of opening the data transmission application by the user, wherein the second interface is used to prompt the user to set the terminal as a data transmit end or a data receive end.

19. The terminal according to claim 18, wherein
the processor is further configured to: in response to the operation of setting the terminal as the data transmit end or the data receive end by the user, control the touchscreen to display prompt information to prompt the terminal to establish a connection to the another terminal.

* * * * *